(12) United States Patent  (10) Patent No.:  US 8,301,676 B2
Miller  (45) Date of Patent:  Oct. 30, 2012

(54) FIELD DEVICE WITH CAPABILITY OF CALCULATING DIGITAL FILTER COEFFICIENTS

(75) Inventor: John Philip Miller, Eden Prairie, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1347 days.

(21) Appl. No.: 11/895,184

(22) Filed: Aug. 23, 2007

(65) Prior Publication Data

US 2009/0055457 A1  Feb. 26, 2009

(51) Int. Cl.
G06F 17/10  (2006.01)
(52) U.S. Cl. .......................................... 708/300
(58) Field of Classification Search .................. 708/300
See application file for complete search history.

(56) References Cited

U.S. PATENT DOCUMENTS

| | | |
|---|---|---|
| 3,096,434 A | 7/1963 | King |
| 3,404,264 A | 10/1968 | Kugler |
| 3,701,280 A | 10/1972 | Stroman |
| 3,705,516 A | 12/1972 | Reis |
| 3,981,836 A | 9/1976 | Pangle, Jr. et al. |
| RE29,383 E | 9/1977 | Gallatin et al. |
| 4,058,275 A | 11/1977 | Banks et al. |
| 4,099,413 A | 7/1978 | Ohte et al. |
| 4,322,976 A | 4/1982 | Sisson et al. |
| 4,337,516 A | 6/1982 | Murphy et al. |
| 4,408,285 A | 10/1983 | Sisson et al. |
| 4,425,798 A | 1/1984 | Nagai et al. |
| 4,435,770 A | 3/1984 | Shiohata et al. |
| 4,493,042 A | 1/1985 | Shima et al. |
| 4,517,468 A | 5/1985 | Kemper et al. |
| 4,527,271 A | 7/1985 | Hallee et al. |
| 4,530,234 A | 7/1985 | Cullick et al. |
| 4,607,325 A | 8/1986 | Horn |
| 4,635,214 A | 1/1987 | Kasai et al. |
| 4,642,782 A | 2/1987 | Kemper et al. |
| 4,644,478 A | 2/1987 | Stephens et al. |
| 4,644,749 A | 2/1987 | Somes |

(Continued)

FOREIGN PATENT DOCUMENTS

CN  10007757  4/1990

(Continued)

OTHER PUBLICATIONS

"Be As Smart As Your Instruments." 1 page.

(Continued)

*Primary Examiner* — Tan V. Mai
(74) *Attorney, Agent, or Firm* — Marshall, Gerstein & Borun LLP

(57) ABSTRACT

A digital filter design algorithm is implemented directly within a process control field device or other process related equipment. Filter design parameters are exposed so that filter design parameter values may be provided to the digital filter design algorithm so that the digital filter design algorithm may calculate digital filter coefficients for a digital filter having desired frequency response characteristics. The digital filter design parameter values may be provided by a user, or may be provided as process variable data output from a process control field device or other process related equipment. Once the coefficients of the digital filter having the desired frequency response characteristics have been calculated, the digital filter may be applied to process variable data received by the process control field device or other process related equipment.

52 Claims, 6 Drawing Sheets

U.S. PATENT DOCUMENTS

| | | |
|---|---|---|
| 4,649,515 A | 3/1987 | Thompson et al. |
| 4,657,179 A | 4/1987 | Aggers et al. |
| 4,683,542 A | 7/1987 | Taniguti et al. |
| 4,707,796 A | 11/1987 | Calabro et al. |
| 4,734,873 A | 3/1988 | Malloy et al. |
| 4,758,964 A | 7/1988 | Bittner et al. |
| 4,763,243 A | 8/1988 | Barlow et al. |
| 4,764,862 A | 8/1988 | Barlow et al. |
| 4,770,543 A | 9/1988 | Burghoff et al. |
| 4,777,585 A | 10/1988 | Kokawa et al. |
| 4,819,233 A | 4/1989 | Delucia et al. |
| 4,831,564 A | 5/1989 | Suga et al. |
| 4,843,557 A | 6/1989 | Ina et al. |
| 4,853,175 A | 8/1989 | Book, Sr. |
| 4,858,144 A | 8/1989 | Marsaly et al. |
| 4,873,655 A | 10/1989 | Kondraske |
| 4,885,694 A | 12/1989 | Pray et al. |
| 4,885,707 A | 12/1989 | Nichol et al. |
| 4,907,167 A | 3/1990 | Skeirik |
| 4,910,691 A | 3/1990 | Skeirik |
| 4,922,412 A | 5/1990 | Lane et al. |
| 4,924,418 A | 5/1990 | Bachman et al. |
| 4,934,196 A | 6/1990 | Romano |
| 4,942,514 A | 7/1990 | Miyagaki et al. |
| 4,944,035 A | 7/1990 | Roger et al. |
| 4,956,793 A | 9/1990 | Bonne et al. |
| 4,964,125 A | 10/1990 | Kim |
| 4,965,742 A | 10/1990 | Skeirik |
| 4,980,844 A | 12/1990 | Demjanenko et al. |
| 4,992,965 A | 2/1991 | Holter et al. |
| 5,005,142 A | 4/1991 | Lipchak et al. |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,862 A | 8/1991 | Takahashi et al. |
| 5,043,863 A | 8/1991 | Bristol et al. |
| 5,050,095 A | 9/1991 | Samad |
| 5,053,815 A | 10/1991 | Wendell |
| 5,070,458 A | 12/1991 | Gilmore et al. |
| 5,081,598 A | 1/1992 | Bellows et al. |
| 5,089,978 A | 2/1992 | Lipner et al. |
| 5,089,984 A | 2/1992 | Struger et al. |
| 5,094,107 A | 3/1992 | Schoch |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,976 A | 6/1992 | Bellows et al. |
| 5,130,936 A | 7/1992 | Sheppard et al. |
| 5,134,574 A | 7/1992 | Beaverstock et al. |
| 5,140,530 A | 8/1992 | Guha et al. |
| 5,142,612 A | 8/1992 | Skeirik |
| 5,148,378 A | 9/1992 | Shibayama et al. |
| 5,158,667 A | 10/1992 | Barlow et al. |
| 5,161,013 A | 11/1992 | Rylander et al. |
| 5,167,009 A | 11/1992 | Skeirik |
| 5,175,678 A | 12/1992 | Frerichs et al. |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,197,328 A | 3/1993 | Fitzgerald |
| 5,200,028 A | 4/1993 | Tatsumi et al. |
| 5,200,958 A | 4/1993 | Hamilton et al. |
| 5,210,704 A | 5/1993 | Husseiny |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,251,151 A | 10/1993 | Demjanenko et al. |
| 5,258,113 A | 11/1993 | Edgerton et al. |
| 5,265,031 A | 11/1993 | Malczewski |
| 5,265,222 A | 11/1993 | Nishiya et al. |
| 5,274,572 A | 12/1993 | O'Neill et al. |
| 5,282,131 A | 1/1994 | Rudd et al. |
| 5,282,261 A | 1/1994 | Skeirik |
| 5,291,190 A | 3/1994 | Scarola et al. |
| 5,293,585 A | 3/1994 | Morita et al. |
| 5,301,101 A | 4/1994 | MacArthur et al. |
| 5,303,181 A | 4/1994 | Stockton |
| 5,305,230 A | 4/1994 | Matsumoto et al. |
| 5,311,421 A | 5/1994 | Nomura et al. |
| 5,311,447 A | 5/1994 | Bonne |
| 5,311,562 A | 5/1994 | Palosamy et al. |
| 5,315,521 A | 5/1994 | Hanson et al. |
| 5,317,520 A | 5/1994 | Castle |
| 5,325,522 A | 6/1994 | Vaughn |
| 5,327,357 A | 7/1994 | Feinstein et al. |
| 5,329,443 A | 7/1994 | Bonaquist et al. |
| 5,333,240 A | 7/1994 | Matsumoto et al. |
| 5,333,298 A | 7/1994 | Bland et al. |
| 5,347,449 A | 9/1994 | Meyer et al. |
| 5,349,541 A | 9/1994 | Alexandro, Jr. et al. |
| 5,351,184 A | 9/1994 | Lu et al. |
| 5,353,207 A | 10/1994 | Keeler et al. |
| 5,353,315 A | 10/1994 | Scarola et al. |
| 5,361,612 A | 11/1994 | Voiculescu et al. |
| 5,369,599 A | 11/1994 | Sadjadi et al. |
| 5,373,452 A | 12/1994 | Guha |
| 5,384,698 A | 1/1995 | Jelinek |
| 5,384,699 A | 1/1995 | Levy et al. |
| 5,386,373 A | 1/1995 | Keeler et al. |
| 5,390,287 A | 2/1995 | Obata et al. |
| 5,390,326 A | 2/1995 | Shah |
| 5,394,341 A | 2/1995 | Kepner |
| 5,394,543 A | 2/1995 | Hill et al. |
| 5,396,415 A | 3/1995 | Konar et al. |
| 5,398,303 A | 3/1995 | Tanaka |
| 5,400,246 A | 3/1995 | Wilson et al. |
| 5,404,064 A | 4/1995 | Mermelstein et al. |
| 5,408,406 A | 4/1995 | Mathur et al. |
| 5,408,586 A | 4/1995 | Skeirik |
| 5,414,645 A | 5/1995 | Hirano et al. |
| 5,419,197 A | 5/1995 | Ogi et al. |
| 5,430,642 A | 7/1995 | Nakajima et al. |
| 5,431,460 A | 7/1995 | Hass et al. |
| 5,440,478 A | 8/1995 | Fisher et al. |
| 5,442,544 A | 8/1995 | Jelinek |
| 5,461,570 A | 10/1995 | Wang et al. |
| 5,467,355 A | 11/1995 | Umeda et al. |
| 5,469,735 A | 11/1995 | Watanabe et al. |
| 5,483,387 A | 1/1996 | Bauhahn et al. |
| 5,485,753 A | 1/1996 | Burns et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,489,831 A | 2/1996 | Harris |
| 5,499,188 A | 3/1996 | Kline, Jr. et al. |
| 5,500,941 A | 3/1996 | Gil et al. |
| 5,504,863 A | 4/1996 | Yoshida et al. |
| 5,511,004 A | 4/1996 | Dubost et al. |
| 5,511,442 A | 4/1996 | Tame |
| 5,519,647 A | 5/1996 | DeVille |
| 5,521,814 A | 5/1996 | Teran et al. |
| 5,521,842 A | 5/1996 | Yamoda |
| 5,528,510 A | 6/1996 | Kraft |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,548,528 A | 8/1996 | Keeler et al. |
| 5,552,984 A | 9/1996 | Crandall et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,570,300 A | 10/1996 | Henry et al. |
| 5,572,420 A | 11/1996 | Lu |
| 5,574,638 A | 11/1996 | Lu |
| 5,586,066 A | 12/1996 | White et al. |
| 5,596,704 A | 1/1997 | Geddes et al. |
| 5,598,521 A | 1/1997 | Kilgore et al. |
| 5,600,148 A | 2/1997 | Cole et al. |
| 5,602,757 A | 2/1997 | Haseley et al. |

| Patent | Date | Inventor |
|---|---|---|
| 5,602,761 A | 2/1997 | Spoerre et al. |
| 5,604,914 A | 2/1997 | Kabe et al. |
| 5,606,513 A | 2/1997 | Louwagie et al. |
| 5,610,339 A | 3/1997 | Haseley et al. |
| 5,623,598 A | 4/1997 | Voigt et al. |
| 5,625,574 A | 4/1997 | Griffiths et al. |
| 5,628,994 A | 5/1997 | Kaper et al. |
| 5,631,825 A | 5/1997 | van Weele et al. |
| 5,640,491 A | 6/1997 | Bhat et al. |
| 5,640,493 A | 6/1997 | Skeirik |
| 5,646,350 A | 7/1997 | Robinson et al. |
| 5,654,841 A | 8/1997 | Hobson et al. |
| 5,665,906 A | 9/1997 | Bayer et al. |
| 5,666,297 A | 9/1997 | Britt et al. |
| 5,671,335 A | 9/1997 | Davis et al. |
| 5,671,351 A | 9/1997 | Wild et al. |
| 5,675,504 A | 10/1997 | Serodes et al. |
| 5,680,409 A | 10/1997 | Qin et al. |
| 5,682,309 A | 10/1997 | Bartusiak et al. |
| 5,687,090 A | 11/1997 | Chen et al. |
| 5,691,895 A | 11/1997 | Kurtzberg et al. |
| 5,692,158 A | 11/1997 | Degeneff et al. |
| 5,698,788 A | 12/1997 | Mol et al. |
| 5,704,011 A | 12/1997 | Hansen et al. |
| 5,715,158 A | 2/1998 | Chen |
| 5,719,767 A | 2/1998 | Jang et al. |
| 5,729,661 A | 3/1998 | Keeler et al. |
| 5,740,324 A | 4/1998 | Mathur et al. |
| 5,742,513 A | 4/1998 | Bouhenguel et al. |
| 5,753,802 A | 5/1998 | Falkler |
| 5,754,451 A | 5/1998 | Williams |
| 5,757,371 A | 5/1998 | Oran et al. |
| 5,757,748 A | 5/1998 | Kiyoura et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,781,878 A | 7/1998 | Mizoguchi et al. |
| 5,790,898 A | 8/1998 | Kishima et al. |
| 5,796,602 A | 8/1998 | Wellan et al. |
| 5,796,606 A | 8/1998 | Spring et al. |
| 5,796,609 A | 8/1998 | Tao et al. |
| 5,798,939 A | 8/1998 | Ochoa et al. |
| 5,803,724 A | 9/1998 | Oortwijn et al. |
| 5,805,442 A | 9/1998 | Crater et al. |
| 5,809,490 A | 9/1998 | Guiver et al. |
| 5,812,394 A | 9/1998 | Lewis et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,838,561 A | 11/1998 | Owen et al. |
| 5,842,189 A | 11/1998 | Keeler et al. |
| 5,847,952 A | 12/1998 | Samad |
| 5,848,365 A | 12/1998 | Coverdill |
| 5,855,791 A | 1/1999 | Hays et al. |
| 5,859,773 A | 1/1999 | Keeler et al. |
| 5,859,885 A | 1/1999 | Rusnica et al. |
| 5,859,964 A | 1/1999 | Wang et al. |
| 5,875,420 A | 2/1999 | Piety et al. |
| 5,877,954 A | 3/1999 | Klimasauskas et al. |
| 5,880,716 A | 3/1999 | Kunugi et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,903,455 A | 5/1999 | Sharpe, Jr. et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,914,875 A | 6/1999 | Monta et al. |
| 5,918,233 A | 6/1999 | La Chance et al. |
| 5,922,963 A | 7/1999 | Piety et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,951,654 A | 9/1999 | Avsan et al. |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 5,995,916 A | 11/1999 | Nixon et al. |
| 5,997,167 A | 12/1999 | Crater et al. |
| 6,006,171 A | 12/1999 | Vines et al. |
| 6,008,985 A | 12/1999 | Lake et al. |
| 6,014,598 A | 1/2000 | Duyar et al. |
| 6,014,612 A | 1/2000 | Larson et al. |
| 6,014,876 A | 1/2000 | Taylor |
| 6,017,143 A | 1/2000 | Eryurek et al. |
| 6,026,352 A | 2/2000 | Burns et al. |
| 6,033,257 A | 3/2000 | Lake et al. |
| 6,035,339 A | 3/2000 | Agraharam et al. |
| 6,038,486 A | 3/2000 | Saitoh et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Haviena et al. |
| 6,108,616 A | 8/2000 | Borchers et al. |
| 6,110,214 A | 8/2000 | Klimasauskas |
| 6,119,047 A | 9/2000 | Eryurek et al. |
| 6,122,555 A | 9/2000 | Lu |
| 6,128,279 A | 10/2000 | O'Neil et al. |
| 6,134,032 A | 10/2000 | Kram et al. |
| 6,134,574 A | 10/2000 | Oberman et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,197,480 B1 | 3/2001 | Iguchi et al. |
| 6,246,950 B1 | 6/2001 | Bessler et al. |
| 6,246,972 B1 | 6/2001 | Klimasauskas |
| 6,259,959 B1 | 7/2001 | Martin |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,638 B1 | 11/2001 | Schreder et al. |
| 6,317,701 B1 | 11/2001 | Pyotsia et al. |
| 6,332,110 B1 | 12/2001 | Wolfe |
| 6,387,114 B2 | 5/2002 | Adams |
| 6,389,331 B1 | 5/2002 | Jensen et al. |
| 6,391,114 B1 | 5/2002 | Kirimura et al. |
| 6,397,114 B1 | 5/2002 | Eryurek |
| 6,400,681 B1 | 6/2002 | Bertin et al. |
| 6,418,465 B1 | 7/2002 | Hirosawa et al. |
| 6,421,571 B1 | 7/2002 | Spriggs et al. |
| 6,445,963 B1 | 9/2002 | Blevins et al. |
| 6,507,797 B1 | 1/2003 | Kliman et al. |
| 6,529,780 B1 | 3/2003 | Soergel et al. |
| 6,532,392 B1 | 3/2003 | Eryurek et al. |
| 6,535,769 B1 | 3/2003 | Konar et al. |
| 6,539,267 B1 | 3/2003 | Eryurek et al. |
| 6,549,130 B1 | 4/2003 | Joao |
| 6,567,718 B1 | 5/2003 | Campbell et al. |
| 6,571,273 B1 | 5/2003 | Shirai et al. |
| 6,591,260 B1 | 7/2003 | Schwarzhoff et al. |
| 6,594,589 B1 | 7/2003 | Coss, Jr. et al. |
| 6,601,005 B1 | 7/2003 | Eryurek et al. |
| 6,601,995 B1 | 8/2003 | Harrison et al. |
| 6,609,036 B1 | 8/2003 | Bickford |
| 6,609,040 B1 | 8/2003 | Brunnemann et al. |
| 6,615,090 B1 | 9/2003 | Blevins et al. |
| 6,628,994 B1 | 9/2003 | Turicchi, Jr. et al. |
| 6,633,782 B1 | 10/2003 | Schleiss et al. |
| 6,651,012 B1 | 11/2003 | Bechhoefer |
| 6,654,697 B1 | 11/2003 | Eryurek et al. |
| 6,690,274 B1 | 2/2004 | Bristol |
| 6,704,689 B1 | 3/2004 | Hogan et al. |
| 6,717,513 B1 | 4/2004 | Sandelman et al. |

| | | | | | | |
|---|---|---|---|---|---|---|
| 6,721,609 | B1 | 4/2004 | Wojsznis | DE | 44 33 593 | | 6/1995 |
| 6,732,191 | B1 | 5/2004 | Baker et al. | DE | 195 02 499 | | 8/1996 |
| 6,738,388 | B1 | 5/2004 | Stevenson et al. | DE | 101 14 206 | A1 | 11/2001 |
| 6,758,168 | B2 | 7/2004 | Koskinen et al. | DE | 102 32 164 | | 2/2004 |
| 6,760,782 | B1 | 7/2004 | Swales | EP | 0 122 622 | | 10/1984 |
| 6,769,171 | B2 | 8/2004 | Jung et al. | EP | 0 362 386 | | 4/1990 |
| 6,774,786 | B1 | 8/2004 | Havekost | EP | 0 377 736 | | 7/1990 |
| 6,813,532 | B2 | 11/2004 | Eryurek et al. | EP | 0 413 814 | | 2/1991 |
| 6,836,705 | B2 | 12/2004 | Hellmann et al. | EP | 0 487 419 | A2 | 5/1992 |
| 6,907,383 | B2 | 6/2005 | Eryurek et al. | EP | 0 581 451 | | 2/1994 |
| 6,965,806 | B2 | 11/2005 | Eryurek et al. | EP | 0 594 227 | | 4/1994 |
| 7,076,380 | B2 | 7/2006 | Michel | EP | 0 612 039 | | 8/1994 |
| 7,079,984 | B2 | 7/2006 | Eryurek et al. | EP | 0 624 847 | | 11/1994 |
| 7,085,610 | B2 | 8/2006 | Eryurek et al. | EP | 0 626 697 | | 11/1994 |
| 7,233,834 | B2 | 6/2007 | McDonald, Jr. et al. | EP | 0 644 470 | | 3/1995 |
| 2002/0022894 | A1 | 2/2002 | Eryurek et al. | EP | 0 715 160 | | 6/1996 |
| 2002/0029130 | A1 | 3/2002 | Eryurek et al. | EP | 0 827 096 | | 3/1998 |
| 2002/0038156 | A1 | 3/2002 | Eryurek et al. | EP | 0 959 398 | | 11/1999 |
| 2002/0067370 | A1 | 6/2002 | Forney et al. | EP | 0 961 184 | | 12/1999 |
| 2002/0077711 | A1 | 6/2002 | Nixon et al. | EP | 0 964 325 | | 12/1999 |
| 2002/0107858 | A1 | 8/2002 | Lundahl et al. | EP | 0 965 897 | | 12/1999 |
| 2002/0133320 | A1 | 9/2002 | Wegerich et al. | EP | 1 630 348 | | 3/2006 |
| 2002/0147511 | A1 | 10/2002 | Eryurek et al. | EP | 1 669 827 | | 6/2006 |
| 2002/0161940 | A1 | 10/2002 | Eryurek et al. | GB | 2 083 258 | | 3/1982 |
| 2002/0163427 | A1 | 11/2002 | Eryurek et al. | GB | 2 294 129 | | 4/1996 |
| 2003/0002969 | A1 | 1/2003 | Risser | GB | 2 294 793 | | 5/1996 |
| 2003/0009572 | A1 | 1/2003 | Thurner | GB | 2 347 234 | | 8/2000 |
| 2003/0014226 | A1 | 1/2003 | Loecher et al. | GB | 2 360 357 | A | 9/2001 |
| 2003/0014500 | A1 | 1/2003 | Schleiss et al. | GB | 2 379 749 | | 3/2003 |
| 2003/0028268 | A1 | 2/2003 | Eryurek et al. | GB | 2 380 833 | | 4/2003 |
| 2003/0028269 | A1 | 2/2003 | Spriggs et al. | GB | 2 394 312 | A | 4/2004 |
| 2003/0065409 | A1 | 4/2003 | Raeth et al. | JP | 05-7138472 | | 8/1982 |
| 2003/0074159 | A1 | 4/2003 | Bechhoefer et al. | JP | 05-033537 | | 2/1993 |
| 2003/0121330 | A1 | 7/2003 | Muhle et al. | JP | 06-242192 | | 9/1994 |
| 2003/0172002 | A1 | 9/2003 | Spira et al. | JP | 06-331507 | | 12/1994 |
| 2003/0195934 | A1 | 10/2003 | Peterson et al. | JP | 07-127320 | | 5/1995 |
| 2003/0236579 | A1 | 12/2003 | Hauhia et al. | JP | 07-152714 | | 6/1995 |
| 2004/0052526 | A1 | 3/2004 | Jones et al. | JP | 07-234988 | | 9/1995 |
| 2004/0064465 | A1 | 4/2004 | Yadav et al. | JP | 08-261886 | | 10/1996 |
| 2004/0068392 | A1 | 4/2004 | Mylaraswamy | JP | 10-039728 | | 2/1998 |
| 2004/0075689 | A1 | 4/2004 | Schleiss et al. | JP | 10-320039 | | 12/1998 |
| 2004/0078171 | A1 | 4/2004 | Wegerich et al. | JP | 11-231924 | | 8/1999 |
| 2004/0095237 | A1 | 5/2004 | Chen et al. | JP | 2000-305620 | | 11/2000 |
| 2004/0125487 | A9* | 7/2004 | Sternad et al. ............... 360/65 | JP | 2001-016662 | | 1/2001 |
| 2004/0158772 | A1 | 8/2004 | Pan et al. | WO | WO-98/38585 | | 9/1998 |
| 2004/0181364 | A1 | 9/2004 | Reeves et al. | WO | WO-99/13418 | | 3/1999 |
| 2004/0249583 | A1 | 12/2004 | Eryurek et al. | WO | WO-00/17721 | | 3/2000 |
| 2005/0007249 | A1 | 1/2005 | Eryurek et al. | WO | WO-00/50851 | | 8/2000 |
| 2005/0015624 | A1 | 1/2005 | Ginter et al. | WO | WO-00/55700 | | 9/2000 |
| 2005/0060103 | A1 | 3/2005 | Chamness | WO | WO-00/62256 | | 10/2000 |
| 2005/0143873 | A1 | 6/2005 | Wilson | WO | WO-01/79947 | A1 | 10/2001 |
| 2005/0197792 | A1 | 9/2005 | Haeuptle | WO | WO-02/06919 | | 1/2002 |
| 2005/0197803 | A1 | 9/2005 | Eryurek et al. | WO | WO-02/23405 | | 3/2002 |
| 2005/0197805 | A1 | 9/2005 | Eryurek et al. | WO | WO-02/071168 | | 9/2002 |
| 2005/0197806 | A1 | 9/2005 | Eryurek et al. | WO | WO-02/071169 | | 9/2002 |
| 2005/0240289 | A1 | 10/2005 | Hoyte et al. | WO | WO-02/071170 | | 9/2002 |
| 2005/0251579 | A1 | 11/2005 | Ngo et al. | WO | WO-02/071171 | | 9/2002 |
| 2005/0256601 | A1 | 11/2005 | Lee et al. | WO | WO-02/071172 | | 9/2002 |
| 2005/0267709 | A1 | 12/2005 | Heavner et al. | WO | WO-02/071173 | | 9/2002 |
| 2006/0020423 | A1 | 1/2006 | Sharpe, Jr. | WO | WO-02/095509 | | 11/2002 |
| 2006/0047489 | A1 | 3/2006 | Scheidt et al. | WO | WO-02/095510 | | 11/2002 |
| 2006/0052991 | A1 | 3/2006 | Pflugl et al. | WO | WO-02/095633 | | 11/2002 |
| 2006/0067388 | A1 | 3/2006 | Sedarat | WO | WO-03/019304 | | 3/2003 |
| 2006/0074598 | A1 | 4/2006 | Emigholz et al. | WO | WO-03/075206 | | 9/2003 |
| 2006/0114979 | A1* | 6/2006 | Pedersen et al. ............. 375/229 | WO | WO-2005/019948 | | 3/2005 |
| 2006/0157029 | A1 | 7/2006 | Suzuki et al. | WO | WO-2005/093531 | | 10/2005 |
| 2006/0206288 | A1 | 9/2006 | Brahmajosyula et al. | WO | WO-2005/093534 | | 10/2005 |
| 2006/0265625 | A1 | 11/2006 | Dubois et al. | WO | WO-2005/093535 | | 10/2005 |
| 2007/0005298 | A1 | 1/2007 | Allen et al. | WO | WO-2006/026340 | | 3/2006 |
| 2007/0010900 | A1* | 1/2007 | Kavaklioglu et al. ........... 700/26 | WO | WO-2006/107933 | | 10/2006 |
| 2007/0097873 | A1 | 5/2007 | Ma et al. | WO | WO-2007/087729 | | 6/2007 |
| 2007/0109301 | A1 | 5/2007 | Smith | WO | WO-2008/014349 | | 1/2008 |
| 2008/0027678 | A1 | 1/2008 | Miller | WO | WO-2008/039992 | | 4/2008 |
| | | | | WO | WO-2008/085706 | | 7/2008 |

FOREIGN PATENT DOCUMENTS

| | | |
|---|---|---|
| CN | 1097804 | 1/1995 |
| CN | 1267373 | 9/2000 |
| DE | 35 40 204 | 9/1986 |
| DE | 40 08 560 | 9/1990 |

OTHER PUBLICATIONS

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.
"Customer Impact," GE Industrial Systems, available at http://www.geindustrial.com/cwc/services?id=73 on Jul. 18, 2002.
"Electrical Equipment Coverage," GE Industrial Systems, available at http://www.geindustrial.com/cwc/services?id=72 on Jul. 18, 2002.
"GE Predictor™ Services: GE Predictor Services Overview," GE Industrial Systems, available at http://www.geindustrial.com/cwc/services?id=71 on Jul. 18, 2002.
"Heat Exchangers," http://www.me.wustl.edu/ME/labs/thermal/me372b5.htm (7 pages).
"Status Signals of Field Instruments," NAMUR Recommendation, NA 64, Feb. 1, 2001, pp. 1-8.
"The HART Protocol—A Solution Enabling Technology," http://www.hartcomm.org 5 pages, (Feb. 2004).
"Time to Tap Into HART," http://www.hartcomm.org 3 pages, Nov. 2003.
Abnormal Situation Management Consortium. www.asmconsortium.com.
Adler, http://www.hartcomm.org , "Continuous HART Communication Increases Safety Integrity Level (SIL)," 3 pages, (Dec. 2000).
Anonymous, "LABVIEW—Digital Filter Design Toolkit User Manual." National Instruments, Retrieved from the Internation on Dec. 8, 2008. URL: http://digital.ni.com/manuals.nsf/websearch/A685C04EF714E986256F800072D9C5.
Anonymous, "Signal Processing Blockset User's Guide—Version 6.0.1," Mathworks, Inc., Internat Publication (2004). URL: http://www.mathworks.com.
Chiang et al. "Fault Detection and Diagnosis in Industrial Systems," 35-84 Springer-Verlag London Limited, (2001).
Chiang, et al., "Fault Diagnosis in Chemical Processes Using Fisher Discriminant Analysis, Discriminant Partial Least Squares, and Principal Component Analysis," *Chemometrics and Intelligent Laboratory Systems*, 50: 243-252 (2000).
Defernez et al., "The Use and Misuse of Chemometrics for Treating Classification Problems," *Trends in Analytical Chemistry*, 16(4): 216-221 (1997).
dotnet.za.net, "Web Services—A Guide for Business and IT Managers (Sep. 23, 2001)", (Copyright 2001), www.dotnet.za.net.
Du et al., "Automated Monitoring of Manufacturing Processes, Part 1: Monitoring Methods," *J. Engineering for Industry*, 117:121-132 (1995).
Ellis et al., "Tutorial: Delayed Coking Fundamentals," AIChE 200 Spring National Meeting—*International Conference on Refining Processes Topical Conference Preprints* (1998).
Erguo et al., "An Input-Training Neural Network-Based Nonlinear Principal Component Analysis Approach for Fault Diagnosis," *Proceedings of the 4th World Congress on Intelligent Control and Automation*, pp. 2755-2759 (2002).
Eryurek et al., "Abnormal Situation Prevention Through Smart Field Devices," NPRA 2005 Annual Meeting, Mar. 13-15, San Francisco, CA (2005).
Frank, "Fault Diagnosis in Dynamic Systems Using Analytical and Knowledge-Based Redundancy—A Survey and Some New Results," Automatica, 26: 459-474 (1990).
Franklin et al., "Parallel Analysis: A Method for Determining Significant Principal Components." *Journal of Vegetation Science*, 6:99-106 (1995).
Geladi, et al., "Partial Least-Squares Regression: A Tutorial," *Analytica Chemica Acta*, 185: 1-17 (1986).
Goulding et al., "Fault Detection in Continuous Processes Using Multivariate Statistical Methods," Control Technology Centre, School of Engineering, University of Manchester, Manchester, UK.
Hamad et al., "Advances in Abnormal Situation Prevention in Refineries and Petrochemical Plants," AIChE 2006, Spring National Meeting.
Helson, "The Impact of HART on Process Automation, The Compelling Case for the World's Most Used Digital Communication Protocol," www.hartcomm.org (Jun. 2004).
Helson, http://www.hartcomm.org "HART Communication: Driving New Product Developments." 11 pages. (Mar. 2004).
Helson, http://www.hartcomm.org "Preventing Process Disruptions—The Solution Could Be in Your Smart Instruments," 4 pages.

Helson, http://www.hartcomm.org "The Impact of HART on Process Automation." 3 pages, (Jun. 2004).
Helson, http://www.hartcomm.org "Understanding the Power of HART Communication." 3 pages, (Mar. 2003).
Hines et al., "Sensor Validation and Instrument Calibration Monitoring." University of Tennesse Maintenance and Reliability Center (2001).
Horch, "Oscillation Diagnosis in Control Loops—Stiction and Other Causes," Proceedings of the 2006 American Control Conference, Minneapolis, Minnesota, pp. 2086-2096 (2006).
Hoskuidsson, "PLS Regression Methods." *Journal of Chemometrics*. 2: 211-228 (1998).
Internet web page print out of internet access: http://www.hartcomm.org/technical/applications/app_main.html Pertaining to HART-based Applications.
Internet web page print out of internet access: http://www.hartcomm.org/technical/benefits.html Pertaining to Benefits of HART Communication.
Internet web page print out of internet access: http://www.hartcomm.org/technical/history.html Pertaining to the HIstory of HART Protocol.
Internet web page print out of internet access: http://www.hartcomm.org/about/abouthcf.html Pertaining to an overview of the Hart Communication Foundation.
Internet web page print out of internet access: http://www.fieldbus.org/indes.php?option=com_content&task=view&id=136 &itemid=307 Pertaining to the History of the Fieldbus Founation.
Internet web page print out of internet access: http://www.fieldbus.org/indes.php?option=com_content&task=view&id=45 &itemid=195 Pertaining to System Technology.
Internet web page print out of internet access: http://www.fieldbus.org/index.php?option=com_content&task=view&id=23 &itemid=208 Pertaining to an Overview of the Fieldbus Foundation.
Internet web page print out of internet access: http://www.hartcomm.org/technical/overview.html Pertaining to an Overview of HART Protocol.
Internet web page printout of internet access: http://www.hartcomm.org/technical/applications/commissioning.html "Commissioning HART Networks."
Internet web page printout of internet access: http://www.hartcomm.org/technical/applications/costsave.html "Cost-Saving Applications."
Internet web page printout of internet access: http://www.hartcomm.org/technical/applications/diagnostics.html "HART Communication and Advanced Diagnostics Work Together to Maximize the Productivity of Instrument Technicians."
Internet web page printout of internet access: http://www.hartcomm.org/technical/applications/dupont.html "DuPont Uses HART Data to Satisfy Safety Interlock System Valve Test Requirements."
Internet web page printout of internet access: http://www.hartcomm.org/technical/applications/enhanced_ddl.html "Enhanced DDL Capabilities Standardize Presentation of Intelligent Device Information-Information for Users and Automation Suppliers."
Internet web page printout of internet access: http://www.hartcomm.org/technical/applications/featappjune2.html "Continuous HART Communication Increases Safety Integrity Level (SIL)."
Internet web page printout of internet access: http://www.hartcomm.org/technical/applications/featappmay.html "Unmanned Offshore Gas Production with HART Networks."
Internet wen page printout of internet access: http://www.hartcomm.org/technical/applications/featappsep.html "Be As Smart As Your Instruments."
Internet web page printout of internet access: http://www.hartcomm.org/technical/applications/hart_connection/hart_connection_main.html , http://www.hartcomm.org/technical/applications/hart_connection/hart_connection_1.html , http://www.hartcomm.org/technical/applications/hart_connection/hart_connection_2.html , http://www.hartcomm.org/technical/applications/hart_connection/hart_connection_3.html , http://www.hartcomm.org/technical/applications/hart_connection/hart_connection_4.html , http://www.hartcomm.org/technical/applications/hart_connection/hart_connection_5.html "The HART Connection."

Internet web page printout of internet access: http://www.hartcomm.org/technical/applications/invmgt.html "Inventory Management Application."
Internet web page printout of internet access: http://www.hartcomm.org/technical/applications/multidrp.htm "HART Multidrop Networks."
Internet web page printout of internet access: http://www.hartcomm.org/technical/applications/multiplexer.html "Multiplexers."
Internet web page printout of internet access: http://www.hartcomm.org/technical/applications/network/compnet.html "Evaluating Fieldbus Networks-Choose the Right Tool for the Job."
Internet web page printout of internet access: http://www.hartcomm.org/technical/applications/nonhart.html "Reading HART Data Into Non-HART Systems."
Internet web page printout of internet access: http://www.hartcomm.org/technical/applications/openarch.html "Open Architecture Applications."
Internet web page printout of internet access: http://www.hartcomm.org/technical/applications/remote.html "Remote Operation Application."
Internet web page printout of internet access: http://www.hartcomm.org/technical/applications/sasol.html "Sasol Wins 2005 HART Plant of the Year Award," (Nov. 1, 2005).
Internet web page printout of internet access: http://www.hartcomm.org/technical/white_papers.html Pertaining to White Papers for HART Communication.
Internet web page printout of internet access: http://www.hartcomm.org/technical/applications/calibrate.html "Calibrating HART Field Devices."
Internet web page printout of internet access: http://www.hartcomm.org/technical/applications/tenmisconceptions.html "Top 10 Misperceptions About HART Technology (Or What You Thought You Knew But Didn't)."
Internet web page printout of internet access: http://www.hartcomm.org/technical/applications/hart_beats.html "HART Beats Stronger."
Isermann. "Fault Diagnosis of Machines via Parameter Estimation and Knowledge Processing Tutorial paper," Automatica, 29: 815-835 (1993).
Kaistha et al., "Incipient Fault Detection and Isolation of Field Devices in Nuclear Power Systems Using Principal Component Analysis", *Nuclear Technology*. 136: 221-230 (2001).
Kalkhoff, "Agent-Oriented Robot Task Transformation," Proceedings of the International Symposium on Intelligent Control, IEEE, pp. 242-247 (Aug. 27, 1995).
Ku et al., "Disturbance Detection and Isolation by Dynamic Principal Componet Analysis," Chemometrics and Intelligent Laboratory Systems. 30: 179-196 (1995).
Lighthammer Illuminator™ Manufacturing Intelligence Brochure "Now you can see all your manufacturing information from a single interface—in real-time from anywhere."
Lighthammer Software Development, "Illuminator™ The 1st 'Plant Information Portal™'" (Copyright 1999).
Lin et al., "A Gray System Modeling Approach of the Prediction of Calibration Intervals," *IEEE Transactions on Instrumentation and Measurement*, 54(1): 297-304 (2005).
Matrikon product brochure, "OPC Archiving at MatrikonOPC.com," www.matrikonopc.com/products/opc-drivers/details.asp?driver=1039. http://www.matrikonopc.com/products/opc-drivers/details.asp?driver=1039 , 3 pages (Feb. 2006).
Matrikon product brochure, "OPC Client for ODBC at MatrikonOPC.com," www.matrikonopc.com/products/opc-drivers/details.asp?driver=1039 http://www.matrikonopc.com/products/opc-drivers/details.asp?driver=1039, 3 pages (Feb. 2006).
Matrikon product brochure, "OPC Desktop Historian at MatrikonOPC.com," www.matrikonopc.com/opc-archiving/opc-desktop-historian.asp http://www.matrikonopc.com/products/opc-archiving/opc-desktop-historian.asp, 4 pages (Feb. 2006).
Mazeda et al., "Supervision and Optimised Process Control in Sugar Beet Factories," Centre of Sugar Technology. Spain from www.univ-reims.fr/externes/avh10mazaeda.pdf.

Mehta et al., "Feedforward Neural Networks for Process Identification and Prediction," presented at ISA 2001, Houston, Texas, Sep. 2001.
Montgomery, "Control Charts as a Tool in SQC (Statistical Quality Control)" Control Charts as a Tool in SQC, available at http://deming.eng.clemson.edu/pub/tutorials/qctools/ccmain1.htm on May 30, 2005.
Naes et al., "Understanding the Collinearity Problem in Regression and Discriminant Analysis," *J. Chemometrics*, 15:413-426 (2001).
Namur Worksheet, "Status Signals of Field Instruments," NA 64, Feb. 1, 2001, pp. 1-8.
OSIsoft product brochure, "Discover the Power of the PI System," www.osisoft.com/5_267.aspx<http://www.osisoft.com/5_267.aspx, 2 pages (Feb. 2006).
OSIsoft product brochure, "The PI System: A Graphic Overview," 2 pages (2002).
OSIsoft product brochure, "The Power of PI System," 24 pages (2002).
Petterson, "Execution Monitoring in Robotics: A Survey," *Robotics and Autonomous Systems*, 53:73-88 (2005).
Pratt, http://www.hartcomm.org , "HART Networks," 32 pages, (Apr. 2002).
Pratt, http://www.hartcomm.org , "Sorting Out the Protocols: Network Soup," 17 pages, (Jan. 2002).
Qin et al., "Nonlinear PLS Modeling Using Neural Networks." *Computers Chem Engng.*, 16(4): 379-391 (1992).
Romeu, "Understanding Binomial Sequential Testing," START: Selected Topics in Assurance Related Technologies, 12(2): 1-6 (2005).
Rosemount Product Documentation, Model 3051S Foundation Fieldbus Supplement, 00809-0200-4801, Rev. AA, www.rosemount.com.
Ruel, "Diagnose Loop Behavior to Find and Correct Problems with Final Control Elements, the Environment, and Upstream Systems Before You Tune the Controller," Loop Optimization, available at http://www.expertune.com/artConApr99.html on Jun. 1, 2006.
Russell et al., "Data-Driven Techniques for Fault Detection and Diagnosis in Chemical Processes," 33-80 Springer-Vertag London Limited (2000).
Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html on May 31, 2006.
Systinet, "Introduction to Web Services", (Copyright 2001, 2002), www.systinet.com.
Szanyi et al., "Diagnostics Capabilities of Foundation Fieldbus Pressure Transmitters," *Hydrocarbon Processing*, pp. 53-59 (Apr. 2003).
Timbalia et al., "Fluid Catalytic Cracking Unit Advanced Control in a Distributed Control System," *ISA Transactions*, 30(2):53-61 (1991).
Tzovla et al., "Abnormal Condition Management Using Expert Systems," presented at ISA 2001, Houston, Texas, Sep. 2001.
Web Services Architech. "What are Web Services" www.webservicesarchitect.com.
Wise et al., "The Process Chemometrics Approach to Process Monitoring and Fault Detection," *J. Proc. Cont.*, 6.(6):329-348 (1996).
Yoon et al., "Fault Diagnosis with Multivariate Statistical Models Part I: Using Steady State Fault Signatures," *Journal of Process Control*, 11: 387-400 (2001).
Yoon et al., "Multivariate Process Monitoring and Early Fault Detection (MSPC) Using PCA and PLS," Plant Automation and Decision Support Conference, San Antonio, Texas, pp. 21-24 (Sep. 2003).
Zhao et al., "A Nonlinear Modeling and Online Monitoring Method for the Batch Process Using Multiple Local PCA," *Proceedings of the Second International Conference on Machine Learning and Cybernetics*, pp. 1190-1194.
Zolera Systems, "A Brief Guide to Web Services Protocols" (Copyright 2001), www.zolera.com.
International Search Report and Written Opinion for Application No. PCT/US2008/072999, dated Dec. 12, 2008.
International Search Report and Written Opinion for Application No. PCT/US2008/074180, dated Oct. 17, 2008.

International Search Report and Written Opinion for Application No. PCT/US2008/078589, dated Feb. 23, 2009.
International Search Report and Written Opinion for Application No. PCT/US2008/078594, dated Jan. 27, 2009.
International Search Report and Written Opinion for Application No. PCT/US2008/078595, dated Nov. 28, 2008.
International Search Report and Written Opinion for Application No. PCT/US2008/078592, dated Dec. 4, 2008.
"Be As Smart As Your Instruments," 1 page. (Apr. 1, 2001).
Goulding et al., "Fault Detection in Continuous Processes Using Multivariate Statistical Methods," Control Technology Centre, School of Engineering, University of Manchester, Manchester, UK (2000).
Helson, http://www.hartcomm.org "Preventing Process Disruptions—The Solution Could Be in Your Smart Instruments," 4 pages (2009).
Internet web page print out of internet access: http://www.hartcomm.org/technical/applications/app_main.html Pertaining to HART-based Applications (Printed Feb. 1, 2007).
Internet web page print out of internet access: http://www.hartcomm.org/technical/benefits.html Pertaining to Benefits of HART Communication (Printed Feb. 1, 2007).
Internet web page print out of internet access: http://www.hartcomm.org/technical/history.html Pertaining to the History of HART Protocol (Printed Feb. 1, 2007).
Internet web page print out of internet access: http://www.hartcomm.org/about/abouthcf.html Pertaining to an overview of the HART Communication Foundation (2006).
Internet web page print out of internet access: http://www.fieldbus.org/indes.php?option=com_content&task=view&id=136 &Itemid=307 Pertaining to the History of the Fieldbus Foundation (2006).
Internet web page print out of internet access: http://www.fieldbus.org/indes.php?option=com_content&task=view&id=45 &Itemid=195 Pertaining to System Technology (2006).
Internet web page print out of internet access: http://www.fieldbus.org/Index.php?option=com_content&task=view&id=23 &itemid=308 Pertaining to an Overview of the Fieldbus Foundation (Printed Feb. 1, 2007).
Internet web page print out of internet access: http://www.hartcomm.org/technical/overview.html Pertaining to an Overview of HART Protocol (Printed Feb. 1, 2007).
Internet web page printout of internet access: http://www.hartcomm.org/technical/applications/commissiong.html."Commissioning HART Networks" (Printed Feb. 6, 2007).
Internet web page printout of internet access: http://www.hartcomm.org/technical/applications/costsave.html "Cost-Saving Applications" (Printed Feb. 6, 2007).
Internet web page printout of internet access: http://www.hartcomm.org/technical/applications/diagnostics.html "HART Communications and Advanced Diagnostics Work Together to Maximize the Productivity of Instrument Technicians" (Printed Feb. 6, 2007).
Internet web page printout of internet access: http://www.hartcomm.org/technical/applications/dupont.html."DuPont Uses HART Data to Satisfy Safety Interlock System Valve Test Requirements" (Printed Feb. 6, 2007).
Internet web page printout of internet access: http://www.hartcomm.org/technical/applications/enhanced_ddl.html "Enhanced DDL Capabilities Standardize Presentation of Intelligent Device Information-Information for Users and Automation Suppliers" (Printed Feb. 6, 2007).
Internet web page printout of internet access: http://www.hartcomm.org/technical/applications/featappjune2.html "Continuous HART Communication Increases Safety Integrity Level (SIL)" (Printed Feb. 6, 2007).
Internet web page printout of internet access: http://www.hartcomm.org/technical/applications/featappmay.html "Unmanned Offshore Gas Production with HART Networks" (Printed Feb. 6, 2007).
Internet web page printout of internet access: http://www.hartcomm.org/technical/applications/featappsep.html "Be As Smart As Your Instruments" (Printed Feb. 6, 2007).
Internet web page printout of internet access: http://www.hartcomm.org/technical/applications/hart_connection/hart_connection_main.html , http://www.hartcomm.org/technical/applications/hart_connection/hart_connection_1.html , http://www.hartcomm.org/technical/applications/hart_connection/hart_connection_2.html , http://www.hartcomm.org/technical/applications/hart_connection/hart_connection 3.html , http://www.hartcomm.org/technical/applications/hart_connection/hart_connection 4.html , http://www.hartcomm.org/technical/applications/hart_connection/hart_connection_5.html "The HART Connection" (Printed Feb. 6, 2007).
Internet web page printout of internet access: http://www.hartcomm.org/technical/applications/invmgt.html."Inventiry Management Application" (Printed Feb. 6, 2007).
Internet web page printout of internet access: http://www.hartcomm.org/technical/applications/multidrp.htm."HART Multidrop Networks" (Printed Feb. 6, 2007).
Internet web page printout of internet access: http://www.hartcomm.org/technical/applications/multiplexer.html, "Multiplexers" (Printed Feb. 6, 2007).
Internet web page printout of internet access: http://www.hartcomm.org/technical/applications/network/compnet. html "Evaluating Fieldbus Networks-Choose the Right Tool for the Job" (Printed Feb. 6, 2007).
Internet web page printout of internet access: http://www.hartcomm.org/technical/applications/nonhart.html "Reading HART Data Into Non-HART Systems" (Printed Feb. 6, 2007).
Internet web page printout of internet access: http://www.hartcomm.org/technical/applications/openarch.html "Open Architecture Applications" (Printed Feb. 6, 2007).
Internet web page printout of internet access: http://www.hartcomm.org/technical/applications/remote.html "Remote Operation Application" (Printed Feb. 6, 2007).
Internet web page printout of internet access: http://www.hartcomm.org/technical/white_papers/white_papers.html Pertaining to White Papers for HART Communication (Printed Feb. 1, 2007).
Internet web page printout of internet access: http://www.hartcomm.org/technical/applications/calibrate.html "Calibrating HART Field Devices" (Printed Feb. 6, 2007).
Internet web page printout of internet access: http://www.hartcomm.org/technical/applications/tenmisconceptions.html "Top 10 Misperceptions About HART Technology (Or What You Thought You Knew But Didn't)" (Printed Feb. 6, 2007).
Internet web page printout of internet access: http://www.hartcomm.org/technical/applications/hart_beats.html "HART Beats Stronger" (Printed Feb. 6, 2007).
Lighthammer Illuminator™ Manufacturing Intelligence Brochure "Now you can see all your manufacturing information from a single interface—in real-time, from anywhere" (available prior to Aug. 23, 2007).
Matrikon product brochure, "OPC Archiving at MatrikonOPC.com," www.matrikonopc.com/broducts/obc-drivers/details.asp?driver=1039 (2006).
Mazeda et al., "Supervision and Optimised Process Control in Sugar Beet Factories," Centre of Sugar Technology, Spain from www.univ-relms.fr/externes/avh10mazaeda.pdf (2003).
Rosemount Product Documentation, Model 3051S Foundation Fieldbus Supplement, 00809-0200-4801, Rev, AA, www.rosemount.com (2002).
International Preliminary Report on Patentability for Application No. PCT/US2008/072999, dated Feb. 24, 2010.

\* cited by examiner

Low-Pass Filter with Cut-off frequency = 3 Hz, and Transition Width = 2 Hz

High-Pass Filter with Cut-off frequency = 7 Hz, and Transition Width = 1 Hz

Band-Pass Filter with Pass-Band Center frequency = 4 Hz,
Pass-Band width=2Hz, and Transition Width = 1 Hz

FIELD DEVICE WITH CAPABILITY OF CALCULATING DIGITAL FILTER COEFFICIENTS

TECHNICAL FIELD

This disclosure relates generally to implementing a digital filter in a process control field device or other process related equipment. In particular the disclosure relates to providing a digital filter design algorithm within an abnormal situation prevention block associated with a smart field device or other intelligent process related equipment.

DESCRIPTION OF THE RELATED ART

Process control systems, like those used in chemical, petroleum or other process plants, typically include one or more centralized or decentralized process controllers. Process controllers may be communicatively coupled to at least one host or operator workstation and to one or more process control and instrumentation devices. Process control and instrumentation devices may comprise, for example, field devices. The one or more centralized or decentralized controllers may be communicatively coupled to the at least one host or workstation and the one or more process control and instrumentation devices via one or more analog, digital or combined analog/digital buses. Field devices, which may be, for example, valves, valve positioners, switches, transmitters, and sensors (e.g., temperature, pressure, and flow rate sensors), are typically located within the process plant environment. The field devices perform functions within the process such as opening or closing valves, measuring process parameters, increasing or decreasing fluid flow, etc. Smart field devices such as field devices conforming to the well-known FOUNDATION™ fieldbus (hereafter "fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks in the field devices such as HART® and fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc., connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines being in improper modes, improperly tuned process control loops, one or more failures in communications between devices within the process plant, etc. These and other problems, while numerous in nature, generally result in the process operating in an abnormal state (i.e., the process plant being in an abnormal condition) which is usually associated with suboptimal performance of the process plant.

Many diagnostic tools and applications have been developed to detect and determine the cause of problems within a process plant and to assist an operator or a maintenance person to diagnose and correct the problems once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management, which include numerous control module and control loop diagnostic tools. Likewise, maintenance workstations, which may be connected to the process control devices, such as field devices, via the same communication connections as the controller applications, or via different communication connections, such as object linking and embedding (OLE) for process control (OPC) connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS™) Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values, and other parameters), etc. Of course, a maintenance person may use this information to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters of field devices, to run a test on one or more field devices to determine the current status of those field devices, to calibrate field devices or other equipment, or to perform other problem detection and correction activities on field devices and other equipment within the process plant.

A process control system may further include an abnormal situation prevention system. An abnormal situation prevention system may reside, at least in part, on a computer or workstation. The computer or workstation implementing at least a portion of an abnormal situation prevention system may communicate with controllers and other equipment within the process plant such as field devices, rotating equipment, power generation equipment, other workstations or support computers, and the like. The controllers and other equipment may include additional components of the abnormal situation prevention system, such as abnormal operation detection systems and abnormal situation prevention modules or tools, including abnormal situation prevention blocks.

Abnormal situation prevention blocks may be located in various controllers, field devices or other equipment. The abnormal situation prevention blocks may include specific routines or techniques for detecting, predicting, and preventing abnormal situations from occurring within the particular type of equipment in which the abnormal situation prevention blocks are located abnormal situation prevention blocks may further include statistical process monitoring (SPM) blocks. SPM blocks collect and process variable data and perform statistical processing on the collected data to determine one or more statistical measures associated with the collected data, such as the mean or the standard deviation of a process variable, and so forth. The abnormal situation prevention blocks may perform additional processing on collected process variable data not typically provided by SPM blocks. For example, an abnormal situation prevention block may provide a digital filter for filtering raw process variable data received from a field device.

When a process control routine requires filtered process variable data, a digital filter may be implemented by an abnormal situation prevention block located directly in or near the particular field device or other process related equipment that measures or otherwise receives the process control variable data. For example, published U.S. Patent Application No. 20070010900 Diagnostics In Industrial Process Control System, filed Apr. 4, 2006, the teaching of which is incorporated herein by reference, describes abnormal situation prevention blocks incorporating various filters. When a digital filter is implemented an operator or maintenance person may choose a generic high pass filter, or low pass filter, or a custom digital filter. Generic high pass or low pass filters may be employed in situations where the user qualitatively wants to filter out the high or low frequency components of a signal, but does not know precisely the frequency of interest. A custom filter allows the user to design a specific filter for a particular application. In one implementation of an abnormal situation prevention block, the custom filter may comprise a 16th order finite impulse response (FIR) filter. In many implementations, the order of the digital filter may be limited by the computational resources in the field device. When a custom filter is selected, the user must design the filter, calculating the coefficients necessary to produce the desired frequency response using an external filter design tool such as Matlab, or the like. Once the coefficients have been calculated the user must manually enter each of the different coefficients into the field device using an appropriate interface tool and communication protocol. In the case where the custom filter is a 16th order FIR filter, the user must use an external filter design tool to calculate 17 coefficients, and enter these 17 coefficients into the field device using an appropriate interface tool and communication protocol.

The ability to create a custom filter offers users great flexibility for filtering raw process variable data. A custom filter allows an operator or maintenance person to monitor specific frequency bands within the received data. Implementing a custom filter, however, is a cumbersome process. Designing the filter, calculating the filter coefficients, and manually entering the coefficients into the field device takes a significant amount of time and effort. Implementing a new custom filter for filtering raw process data is not a task that one would want to repeat over and over again on a regular basis. Manually entering all of the coefficients associated with a 16th order digital filter is especially burdensome and is prone to errors. Therefore, under the current regime, implementing a custom filter is not a practical option for situations in which the desired characteristics of a particular digital filter may change over time. An operator or maintenance person will not want to design a new filter, calculate new coefficients and manually enter the new filter coefficients each time the process conditions require a filter having a different frequency response. Furthermore, the current procedure for implementing a custom filter in an abnormal situation prevention block associated with a field device or other process related equipment does not lend itself to dynamic changes. Under certain circumstances, the filter characteristics may need to be changed "on-the-fly" while the process is in progress. The current procedure does not allow digital filter characteristics to be changed or updated as process conditions demand.

SUMMARY OF THE DISCLOSURE

The present disclosure relates to implementing a digital filter in a process control field device or other process related equipment. A digital filter design algorithm, such as the Parks-McClellan filter design algorithm, is implemented directly within a process control field device or other process related equipment. Filter design parameters are exposed via an interface associated with a process configuration tool. A user may enter filter design parameter values corresponding to the frequency response characteristics of a desired filter, and the filter design algorithm calculates digital filter coefficients based on the entered filter design parameters. The process control field device or other process related equipment may then apply the digital filter to process variable data measured by the process control field device or other process related equipment. Alternatively, the digital filter design algorithm may be implemented as an abnormal situation prevention function block such that one or more of the digital filter design parameters may be calculated directly within the process control logic. In this case, process variable data may be input to the abnormal situation prevention function block such that one or more filter design parameters may be based on one or more process operating conditions.

According to an embodiment, a system for implementing a digital filter for filtering process variable data includes an intelligent device, such as a smart field device, for implementing a digital filter design algorithm. An interface exposes digital filter design parameters so that digital filter design parameter values may be provided to the digital filtered design algorithm. The intelligent device executes the digital filter design algorithm using the digital filter design parameter values to create a digital filter having desired frequency response characteristics. The intelligent device may then apply the digital filter to received process variable data.

Another embodiment calls for an intelligent process control device. The intelligent process control device includes a processor and a memory. The memory stores a digital filter design algorithm to be executed by the processor. A first input is adapted to receive digital filter design parameter values. The digital filter design parameter values specify various frequency response characteristics of the desired digital filter. A second input is adapted to receive process variable data. The processor executes the digital filter design algorithm using the received digital filter design parameter values to create a digital filter having the desired frequency response characteristics. The processor then applies the digital filter to the received process variable data.

Yet another embodiment provides a method of filtering process variable data. The method calls for implementing a digital filter design algorithm in a process related control device. One or more filter design parameters are exposed to an interface so that filter design parameter values may be provided to the digital filter design algorithm. Once the digital filter design parameters have been provided to the digital filter design algorithm, the method calls for calculating digital filter coefficients using the digital filter design algorithm and the digital filter design parameter values. When the digital filter coefficients have been calculated, the digital filter may be applied to raw process variable data to remove frequency components outside a particular frequency band of interest.

Further aspects and advantages will be apparent to those of ordinary skill in the art from a review of the following detailed description, taken in conjunction with the drawings. While the compositions and methods are susceptible of embodiments in various forms, the description hereafter includes specific embodiments with the understanding that the disclosure is illustrative, and is not intended to limit the invention to the specific embodiments described herein.

DETAILED DESCRIPTION

Figure 1:
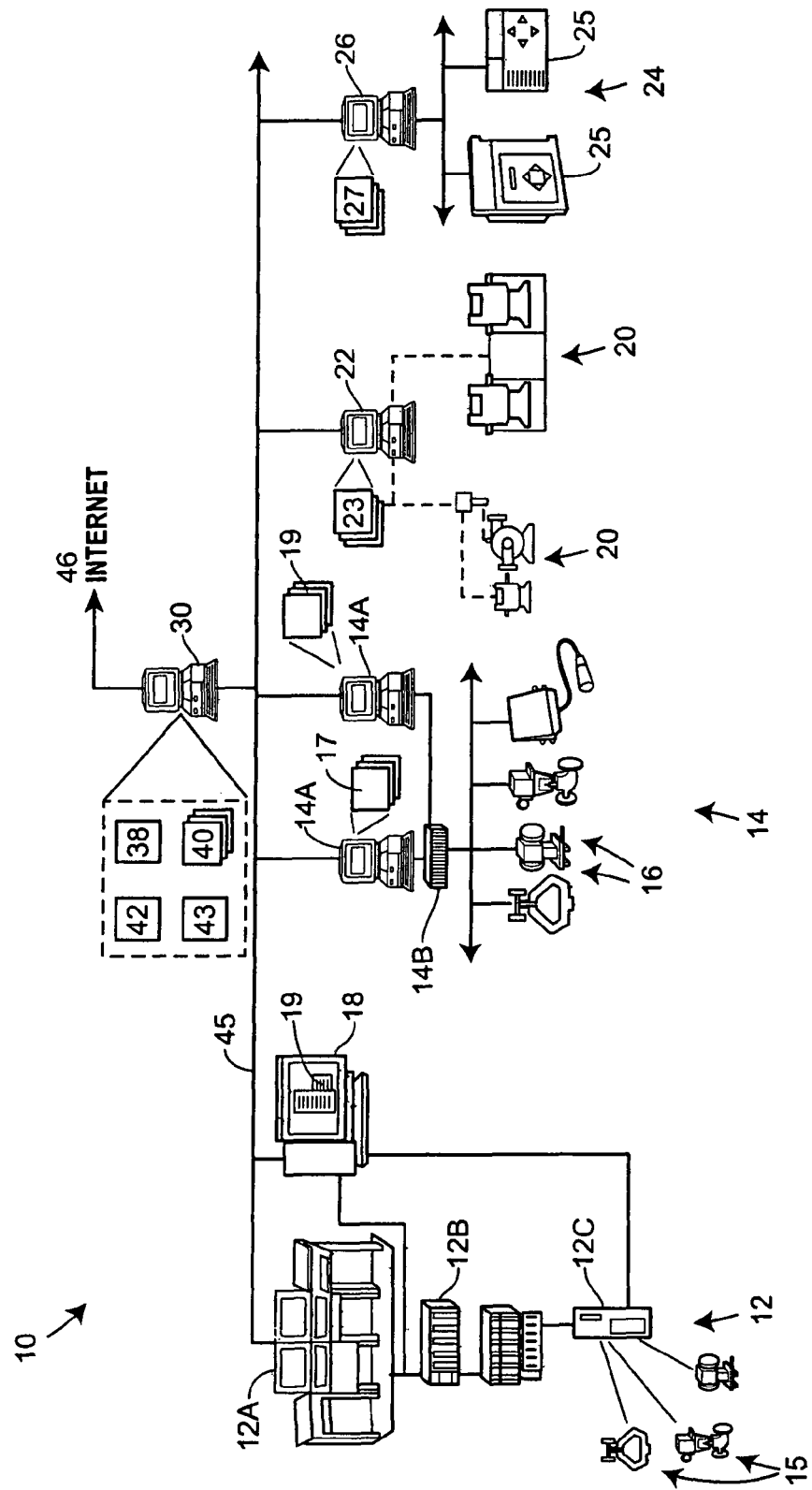
FIG. 1 is an exemplary block diagram of a process plant having a distributed control and maintenance network including one or more operator and maintenance workstations, controllers, field devices and supporting equipment, in which an abnormal situation prevention system may be implemented.

Referring now to FIG. 1, an exemplary process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART®) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART® or fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ application and/or the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating (and other) equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by CSI (an Emerson Process Management Company), as well the applications, modules, and tools described below, to diagnose, monitor and optimize the operating state of the rotating equipment 20 and other equipment in the plant. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42. Additionally, the computer system 30 may implement an alert/alarm application 43.

Generally speaking, the abnormal situation prevention system 35 may communicate with (or include) abnormal operation detection systems, modules or tools (not shown in FIG. 1) optionally located in the field devices 15, 16, the controllers 12B, 14B, the rotating equipment 20, the support computer 22, the power generation equipment 25 or support computer 26, or any other desired devices and equipment within the process plant 10. The abnormal situation prevention system 35 may also interact with the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each or at least some of the computers or devices within the plant 10, or, alternatively may be connected via any other desired communication connection including, for example, wireless connections, dedicated connections which use OPC (or OLE for process control), intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

By way of background, OPC is a standard that establishes a mechanism for accessing process data from the plant or process control system. Typically, an OPC server is implemented in a process control system to expose or provide process information from, for example, field devices. An OPC client creates a connection to an OPC server and writes or reads process information to or from a field device. OPC servers use OLE technology (i.e., Component Object Model or COM) to communicate with such clients so that the software applications implemented by the clients can access data from the field devices or other process plant equipment.

Figure 2:
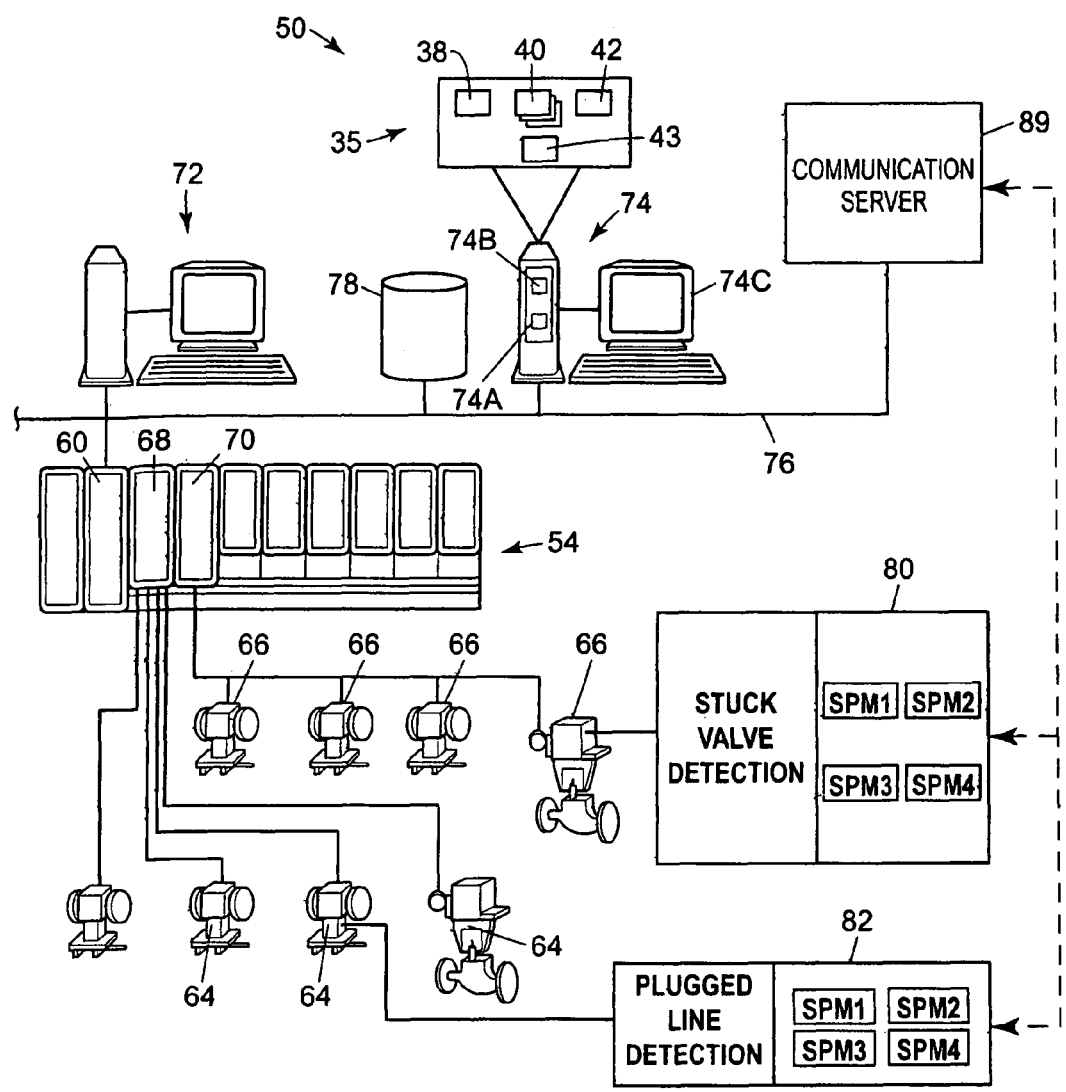
FIG. 2 is an exemplary block diagram of a portion of the process plant of FIG. 1 illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART® and fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART® field devices and the field devices 66 are illustrated as fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection (i.e., abnormal situation prevention, or abnormal situation prevention) blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such as process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve process variable data to determine if the valve is in a stuck condition. In addition, the block 80 may include a set of one or more statistical process monitoring (SPM) blocks or units such as blocks SPM1-SPM4 which may collect process variable or other data within the field device and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated, is critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

Although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known fieldbus SPM blocks, or SPM blocks that have different or additional capabilities as compared with known fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the fieldbus protocol, or some other protocol, such as Profibus, HART®, CAN, etc. protocol. If desired, the underlying operation of blocks 80, 82 may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM blocks located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may include one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Further details regarding the implementation and configuration of abnormal situation prevention systems and components thereof can be found in U.S. Pat. Publ. No. 2005/0197803, now U.S. Pat. No. 7,079,984 ("abnormal situation prevention in a process plant"), U.S. Pat. Publ. No. 2005/0197806 ("Configuration system and method for abnormal situation prevention in a process plant"), and U.S. Pat. Publ. No. 2005/0197805 ("Data presentation system for abnormal situation prevention in the process plant"), each of which is hereby incorporated by reference for all purposes.

In the abnormal situation prevention systems and techniques described above and in the referenced documents, the SPM (or abnormal situation prevention) blocks 80, 82 may be associated with, or considered components of, one or more abnormal situation prevention modules. While abnormal situation prevention blocks may reside in a field device, where the faster-sampled data is available, abnormal situation prevention modules may reside in a host system or controller. The abnormal situation prevention modules may take data from one or more abnormal situation prevention blocks, and use the data to make a decision about the larger system. More generally, an abnormal situation prevention module may be developed and configured to receive data from one or more function blocks (e.g., Abnormal situation prevention blocks) to support diagnostics for each type of field device, instrumentation or other equipment (e.g., valve, pump, etc.). Nonetheless, the function blocks associated with an abnormal situation prevention module may reside and be implemented by devices other than the specific equipment for which it was developed. In such cases, the abnormal situation prevention module has a distributed nature. Other abnormal situation prevention modules may be implemented entirely within one device, such as the process controller 60, despite being directed to diagnostics for a specific field device. In any event, a diagnostics routine or technique may be developed for each equipment type for detecting, predicting and preventing abnormal situations or operation of the equipment (or process). For ease in description only, the term "abnormal situation prevention module" will be used herein to refer to such routines or techniques. An abnormal situation prevention module is therefore responsive to a set of measurements needed to perform the diagnostics, and further includes (i) a set of abnormal conditions to be detected by the module, and (ii) a set of rules, which link a change in the measurements to a corresponding abnormal condition. Furthermore, references to abnormal situation prevention modules in the description of the disclosed techniques to follow are set forth with the understanding that the techniques may be utilized in conjunction with abnormal situation prevention blocks as well.

In some cases, the configuration application 38 or other component of the abnormal situation prevention system 35 may support the development or generation of a template for each abnormal situation prevention module. For example, the configuration and development platform provided by the DeltaV™ control system may be used to create specific instances, or instantiations, of abnormal situation prevention modules from corresponding composite template blocks.

Although shown and described in connection with FIG. 2 as abnormal situation prevention functionality, the modules and blocks described above may be more generally directed to implementing multivariate statistical techniques configured for process monitoring and diagnostics and fault detection. In some cases, the techniques described below may include or be integrated with abnormal situation prevention modules or blocks. In any case, references below to systems and techniques (and any modules, function blocks, applications, software or other components or aspects thereof) may utilize, include, be integrated with, or otherwise be associated with the workstation tools 17, 19, operator interfaces 12A, 14A, applications 23, abnormal situation prevention system 25 and interfaces 72, 74 described above.

As mentioned above, the abnormal operation detection routines executed by the abnormal situation prevention blocks may process variable data in ways not provided by typical SPM blocks. Filtering process variable data is one example of the type of processing that may be performed by an abnormal situation prevention block 80, 82 that is not provided by typical SPM blocks. A digital filter may be implemented within an abnormal situation prevention block for filtering process variable data received from the field device in which the abnormal situation prevention block is located or data received from another remote field device or other remote equipment. The process variable data may be filtered by a finite impulse response (FIR) filter, or an infinite impulse response (by IIR) filter such as a low pass filter, high pass filter, bandpass filter, or some other type of filter implemented by the abnormal situation prevention block.

abnormal situation prevention blocks have been developed implementing a number of filters having different frequency response characteristics. Preconfigured digital filters implemented in abnormal situation prevention blocks, include a low pass and high pass filters, as well as bandpass filters having common cut off frequencies and other typical frequency response characteristics. Furthermore, abnormal situation prevention blocks have been provided for implementing custom digital filters, such as a 16th order FIR digital filter. For example, a 16th order custom digital filter has been implemented in one implementation of an abnormal situation prevention block adapted to be executed by a smart field device conforming to the well-known fieldbus or HART® protocols. However, as has been described, implementing such a filter is a fairly difficult task. An operator must first calculate the filter coefficients of the custom digital filter using a filter design tool. Once the coefficients have been calculated, they must be manually entered into the field device via a user interface or other configuration tool. In the case where the filter is a 16th order FIR filter, the operator must calculate 17 coefficients, and enter them all into the field device. While this procedure may be acceptable for situations where the filter coefficients only need to be calculated and entered once, it is wholly inadequate for situations where the necessary filter characteristics may change over time, or where a different frequency response is required for different process operating conditions.

An improved method for implementing a digital filter having a customized frequency response is to calculate the filter coefficients directly within an abnormal situation prevention block associated with a field device or other process related equipment. There are many algorithms available for calculating the optimal coefficients of the digital filter of a particular order and having desired frequency response characteristics. Equiripple filter design algorithms are often the best suited algorithms for many applications. Equiripple filter design algorithms minimize the "worst case response" of a filter. In other words, equiripple filter design algorithms reduce the maximum ripple of the filter's frequency response in the frequency band of interest. The Remez Exchange algorithm was the first equiripple filter design algorithm developed to reduce the magnitude of the maximum ripple in the frequency bands of interest. Today the Parks-McClellan algorithm is the most commonly used. An embodiment of an abnormal situation prevention block adapted to calculate digital filter coefficients and implement a corresponding digital filter may employ the Parks-McClellan algorithm, the Remez Exchange algorithm, or any other filter design algorithm capable of determining the coefficients of a digital filter having the desired frequency response characteristics.

Figure 3:
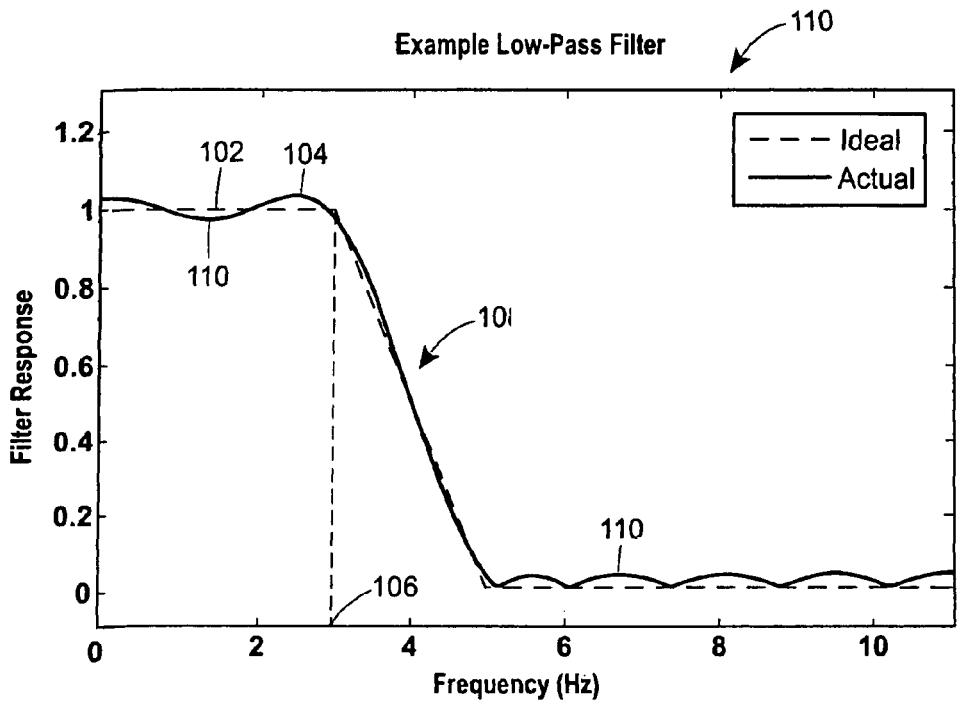
FIG. 3 is a frequency plot showing the frequency response of a low pass digital filter created using the Parks-McClellan Algorithm.

FIG. 3 is a frequency plot 100 showing the frequency response of a low pass digital filter having coefficients calculated using the Parks-McClellan algorithm. The frequency plot 100 shows an ideal frequency response curve 102, and the actual frequency response curve 104 of a digital filter having coefficients calculated using the Parks-McClellan algorithm. The low pass filter has a cut off frequency 106 of 3 Hz, and a transition region with a width 108 of 2 Hz. The width of the transition region may be referred to as the "transition width." As can be seen, the actual frequency response curve 104 includes a small amount of ripple 110.

Figure 4:
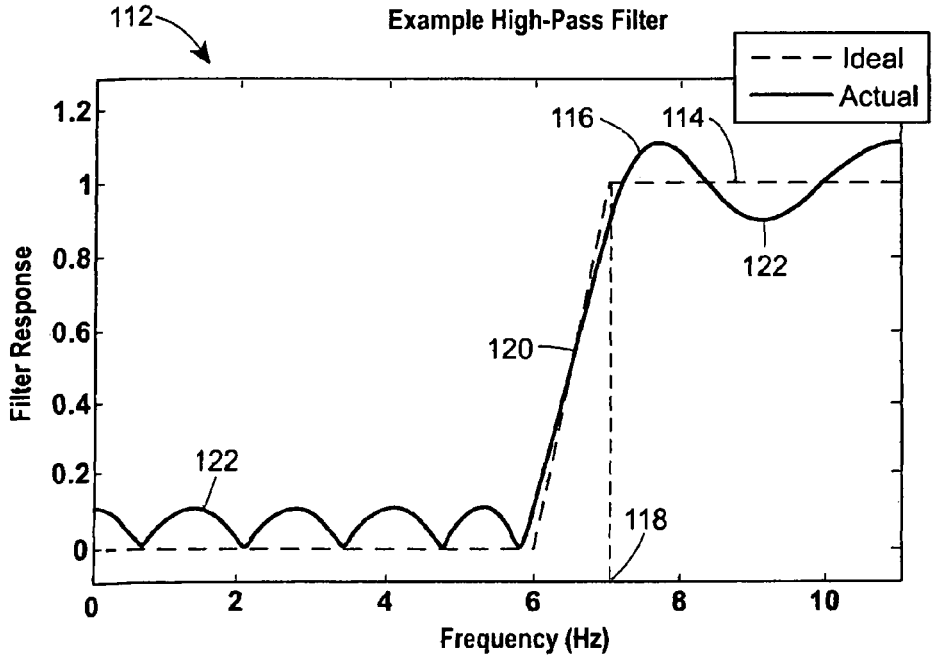
FIG. 4 is a frequency plot showing the frequency response of a high pass digital filter created using the Parks McClellan Algorithm.

FIG. 4 is a frequency plot 112 showing the frequency response of a high pass digital filter having coefficients calculated using the Parks-McClellan algorithm. The frequency plot 112 also shows an ideal frequency response curve 114 and the actual frequency response curve 116 of a digital filter having coefficients calculated using the Parks-McClellan algorithm. The high pass filter has a cut off frequency 118 of 7 Hz, and a transition width 120 of 1 Hz. Again, the actual frequency response curve 116 includes a small amount of ripple 122. The ripple 122 in the frequency response curve 116 of the high pass filter is greater than the ripple 110 in the frequency response curve 104 of the low pass filter due to the narrower transition width between the pass band and the stop band of the high pass filter.

Figure 5:
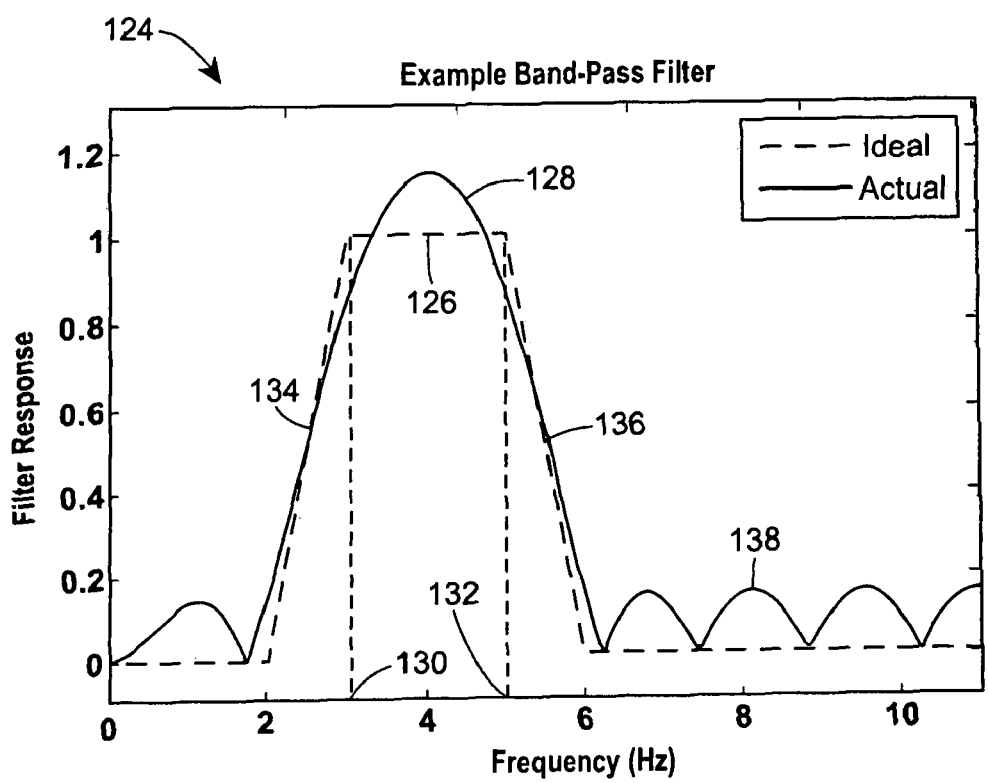
FIG. 5 is a frequency plot showing the frequency response of a bandpass filter created using the Parks-McClellan Algorithm.

FIG. 5 is a frequency plot 124 showing the frequency response of a digital bandpass filter having coefficients calculated using the Parks-McClellan algorithm. The frequency plot 124 shows the ideal frequency response curve 126 and the actual frequency response 128 of a digital filter having coefficients calculated using the Parks-McClellan algorithm. The bandpass filter has a low frequency cut off frequency of 3 Hz and a high frequency cut off frequency of 5 Hz. The center frequency of the passband is 4 Hz. The frequency response has a low frequency transition width 134 and a high frequency transition width 136 of 1 Hz. The actual frequency response curve includes ripple 138.

In order to use the Parks-McClellan algorithm to calculate digital filter coefficients, one must specify the order of the filter and the values of various parameters that define the desired frequency response. For example, when designing a digital filter using the Parks-McClellan algorithm one may specify whether the filter is to be a low pass filter, a high pass filter, or a bandpass filter. If the filter is to be a low pass or a high pass filter, one may specify the cutoff frequency and the width of the transition region between the passband and the stop band. If the filter is to be a bandpass filter, one may specify the center frequency of the passband, the width of the passband, and the widths of the transition regions between the passband and the stopband. Alternatively, rather than specifying the center frequency and the width of the passband, one may specify the low frequency cut off frequency and the high-frequency cut off frequency of the desired passband. However, a drawback to specifying the passband in this manner is that if at a later time the passband needs to be shifted to a higher or lower frequency band, both the low frequency cut off and the high-frequency cut off parameters must be changed, whereas if the center frequency and the width of the passband are defined, only the center frequency value needs to be updated in order to shift the passband to a higher or lower frequency range.

In order to implement the Parks-McClellan algorithm within an abnormal situation prevention block associated with a field device or other process related equipment, the filter type (low pass, high pass, bandpass, etc.), the cut off frequency, transition width, or in the case of a bandpass filter, the center frequency and the passband width or the high frequency and low frequency cut off frequencies, and the transition widths must be configurable parameters of the abnormal situation prevention block implemented in the field device or other process related equipment. The configurable parameters of the abnormal situation prevention block must be exposed via an appropriate communication protocol (e.g. Harts or fieldbus) and an appropriate interface device to allow authorized personnel to enter parameter values to configure a digital filter having the desired characteristics. The appropriate interface device may comprise any process related equipment configuration tool, such as a hand-held communicator (e.g. the 375 Field Communicator from Emerson Process Management), a computer workstation, with software for field device configuration, (e.g. AMS™ Device Manager from Emerson Process Management), or a control system (e.g. DeltaV or Ovation, also from Emerson Process Management).

Exposing the configurable filter parameters associated with an abnormal situation prevention block implementing a configurable custom filter in a field device or other process related equipment may include, for example, implementing the configurable parameters in the field device or other process related equipment as parameters conforming to a known digital communication, such as HART® or fieldbus, and creating a device description (DD) file, defining these parameters. The field device's or other process related equipment's device description may then be imported into a configuration tool, which may include an interface application for displaying the configurable filter parameters to a user, and allowing the user to enter values for the various parameters corresponding to the desired filter characteristics.

Figure 6:
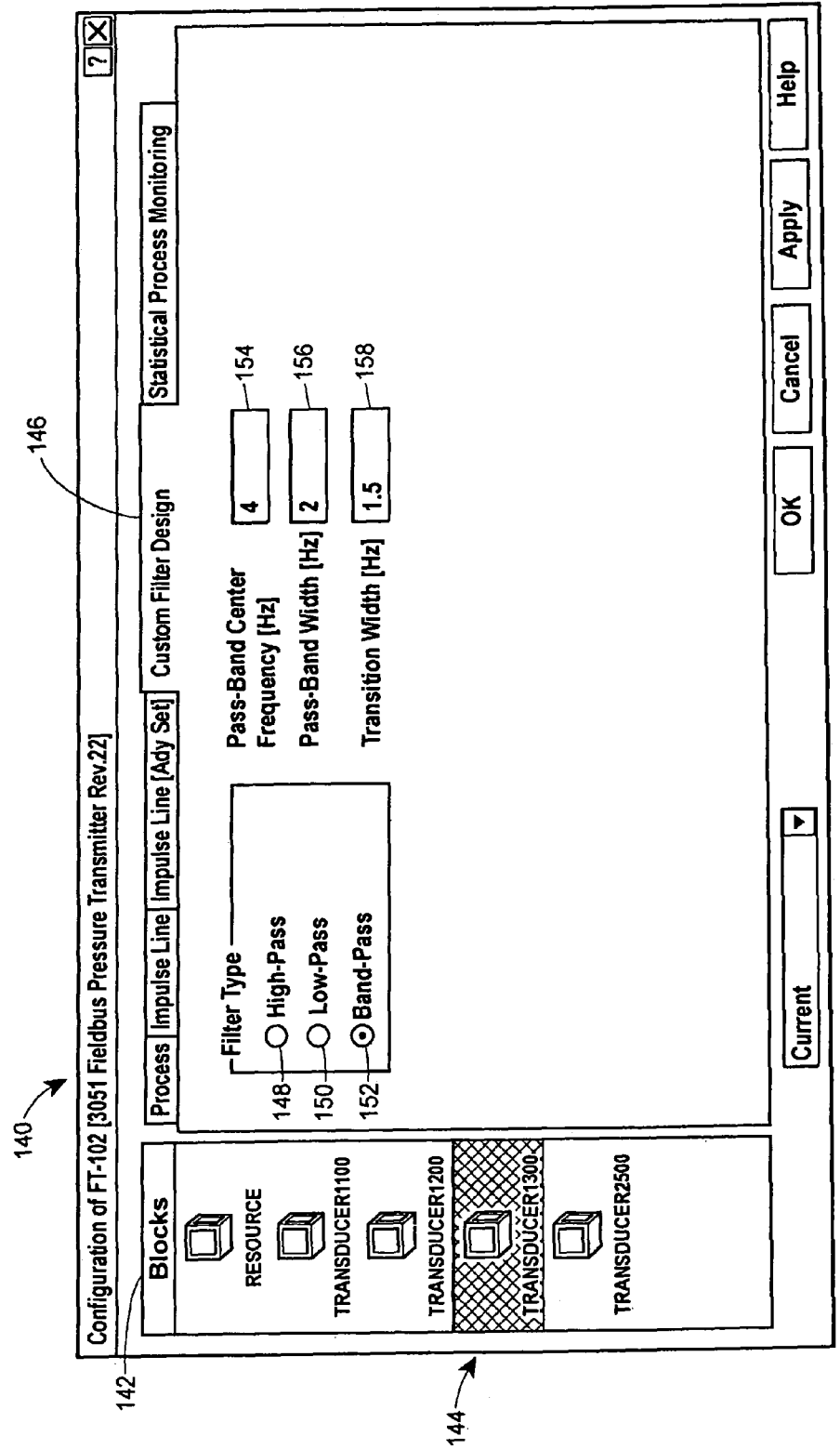
FIG. 6 is a screen shot of a configuration tool interface page exposing digital filter design parameters.

For example, FIG. 6 shows a device configuration page 140 of the DeltaV distributed control system from Emerson Process Management. The configuration page 140 includes a list 142 of field device blocks allowing a user to select a desired resource block or transducer block within the field device in which the custom digital filter is to be implemented. In the example shown, the user has selected a particular transducer block 144 within the field device. The selected transducer block 144 includes an abnormal situation prevention block implementing a configurable digital filter. The interface page for custom filter design is accessed by selecting the custom filter design tab 146. The configurable parameters of the digital filter type may be selected via the radio buttons 140, 150, 152 in the filter type selection area, and the cut off frequencies, the passband width and the transition width may be entered in the frequency response characteristics fields 154, 156, 158. Note that the various data fields available for entering the various frequency response characteristics of the desired filter may be dependent on the type of filter selected. In the example shown, for instance, a bandpass filter has been selected. Accordingly, the frequency response characteristics fields include the passband center frequency 154, the passband width 156, and the transition width 158. In cases where either a high pass or low pass filter has been selected, only the cut off frequency and the transition width need to be specified.

The method of configuring a digital filter within a field device or other process related equipment described above works well for situations where the filter must only be configured once, such as when the field device is initially installed. However, if circumstances are such that the required filter characteristics may change from time to time, or worse, on a continual basis depending on process conditions, manually configuring the filter over and over again becomes a burden on operators and maintenance personnel. If the required filter characteristics change often, repeatedly accessing the appropriate interface page, entering the modified filter parameters, and reconfiguring the filter can take valuable time away from an operator's more important responsibilities. Such a task becomes impossible if the filter characteristics must be updated on a continuous basis, for example, if the frequency response of the filter is tuned to the speed of a particular piece of rotating equipment and the speed of the rotating equipment is subject to change while the process is running.

This problem may be resolved by implementing the filter design algorithm as a fieldbus function block. In this case, the filter design parameters (filter type, cut off frequency, transition width, etc.) may be exposed to the control system as parameters of the function block. When configured in this way, the filter parameters may be modified directly within the control logic of the process control system (e.g., DeltaV, or the like). For example, in the case were the frequency response characteristics are to be based on the operating speed of a particular piece of rotating equipment, the rotational speed of the equipment may be provided as an input to the function block. The function block may be adapted to select various filter design parameter values appropriate for the received speed value. Of course, the rotational speed of a piece of rotating equipment is just one example of a process variable that may have an impact on the desired frequency response characteristics of a digital filter. It should be clear that substantially any process variable may be employed as a parameter for determining the desired characteristics of the digital filter and provided as an input to a fieldbus function block as described below.

Figure 7:
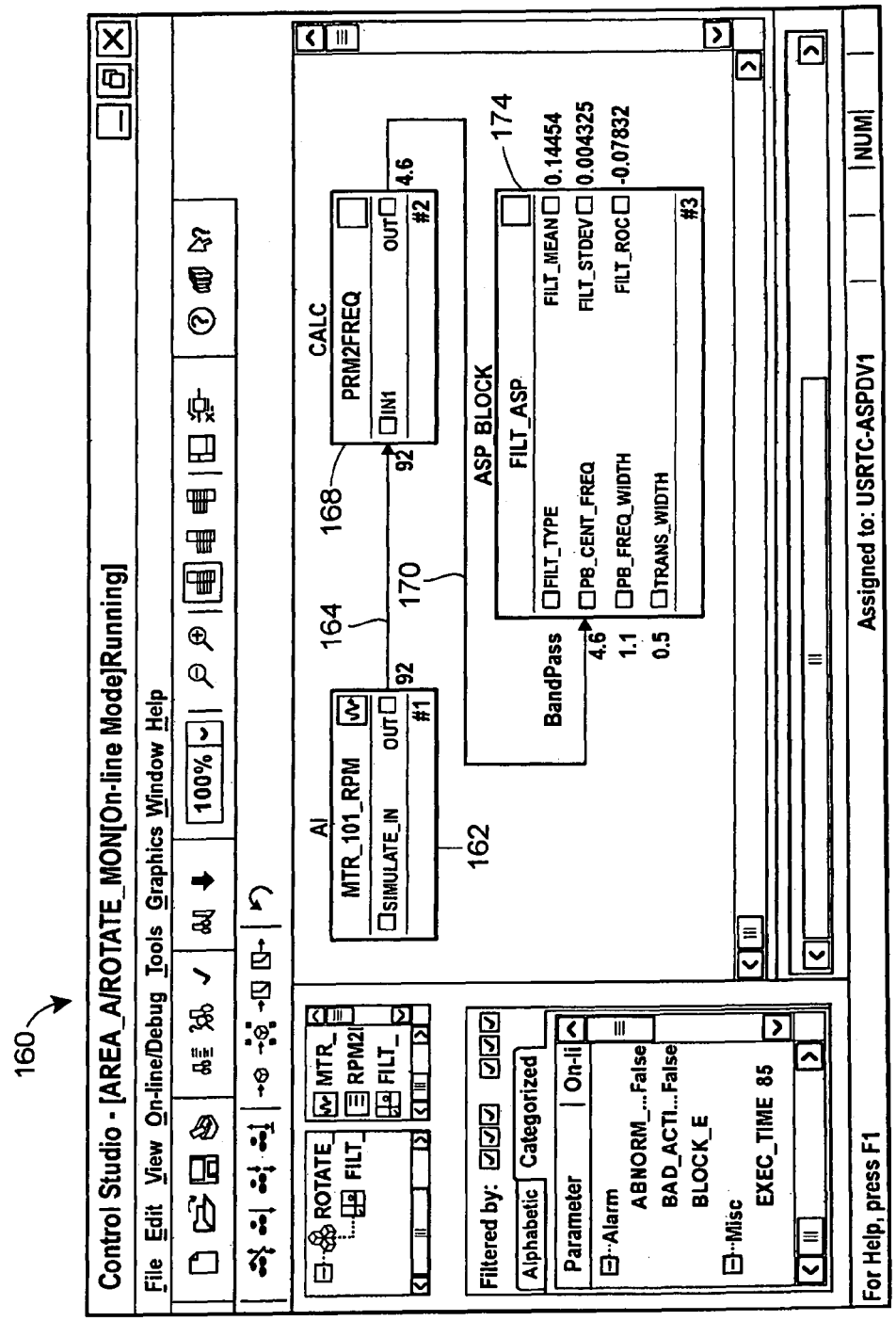
FIG. 7 is a screen shot of a configuration tool interface page for implementing a digital filter design algorithm as a function block within an abnormal situation prevention system.

An example of a digital filter design algorithms implemented as a fieldbus function block is shown in FIG. 7. FIG. 7 is an interface page 160 of a process control configuration tool. The process control configuration tool may be, for example, DeltaV Control Studio provided by Emerson Process Management for designing and implementing process control routines for the DeltaV distributed process control system, also provided by Emerson Process Management. The interface page 160 shows an analog input (AI) function block 162, a calculation (calc) function block 168, and an abnormal situation prevention block (abnormal situation prevention Block) 174. The abnormal situation prevention block 174 implements a digital filter design algorithm for determining the coefficients of the digital filter, and applies the digital filter to a process variable data signal received from a field device or other process related equipment. In this example, the AI block 162 provides the rotational speed 164 of Motor 101 in revolutions per minute (rpm). The speed of Motor 101 is received as an input to the calculation block 168. Calculation block 168 calculates the desired center frequency 170 of a bandpass filter based on the speed 164 of Motor 101. For example, the calculation block may calculate the center frequency of the bandpass filter by setting the center frequency equal to a percentage of the received motor speed. Of course, other formulas may be employed for calculating the center frequency of the filter (or the cut-off frequency of the filter in the case of high pass or low pass filters). Additional filter parameters may be set manually as described above. Thus, for the example shown in FIG. 7, the passband width is manually set to 1.1 Hz and the transition width is set to 0.5 Hz. The result is a bandpass filter having a narrow 1.1 Hz passband centered at a frequency determined by the rotational speed of Motor 101.

In addition to calculating the coefficients of the desired digital filter, the Abnormal Situation Prevention block 174 may actually implement the digital filter within the process control routine. For example, the filter may be applied to an input signal associated with a field device or other process related equipment. SPM blocks or other abnormal situation prevention blocks may then analyze the filtered signal to make control decisions based on the status of the filtered process variable data.

Implementing a digital filter design algorithm in an abnormal situation prevention block of a field device or other process related equipment reduces the effort necessary to implement a custom designed digital filter in a process control routine. Only a small number of filter parameters must be exposed to the operator configuring the filter. If desired, process control variables may be input directly into an abnormal situation prevention function block configured to calculate the digital filter coefficients. In this case, the frequency response characteristics may be updated "On-the-fly" as the process is underway. Thus, the frequency response characteristics of the digital filter may be determined by the value of some other process control variable.

The present invention has been described with reference to specific examples. These examples are intended to be illustrative only and should not be read as limiting the invention in any way. It will be apparent to those of ordinary skill in the art that changes, additions, or deletions may be made to the disclosed embodiments without departing from the spirit and scope of the invention.

What is claimed is:

1. A system for implementing a digital filter for filtering process variable data, the system comprising:
   an intelligent device adapted to receive process variable data, implement a digital filter design algorithm, and apply a digital filter to the received process variable data; and
   an interface adapted to expose digital filter design parameters such that digital filter design parameter values may be provided to the digital filter design algorithm to design a digital filter having desired frequency response characteristics to be applied to the received process variable data.

2. The system for implementing a digital filter of claim 1 wherein the digital filter design algorithm comprises an equiripple filter design algorithm.

3. The system for implementing a digital filter of claim 1 wherein the digital filter design algorithm comprises a Remez Exchange filter design algorithm.

4. The system for implementing a digital filter of claim 1 wherein the digital filter design algorithm comprises a Parks-McClellan filter design algorithm.

5. The system for implementing a digital filter of claim 1 wherein the exposed digital filter design parameters comprise a filter type.

6. The system for implementing a digital filter of claim 5 wherein the filter type comprises one of a highpass or a lowpass filter.

7. The system for implementing a digital filter of claim 6 wherein the exposed filter parameters further comprise a cut-off frequency.

8. The system for implementing a digital filter of claim 5 wherein the filter type comprises a bandpass filter.

9. The system for implementing a digital filter of claim 8 wherein the exposed digital filter design parameters further comprise a passband center frequency and a passband width.

10. The system for implementing a digital filter of claim 8 wherein the exposed digital filter design parameters further comprise a low frequency cut-off frequency and a high-frequency cut off frequency.

11. The system for implementing a digital filter of claim 5 wherein the filter type comprises an infinite impulse response filter.

12. The system for implementing a digital filter of claim 5 wherein the filter type comprises a finite impulse response filter.

13. The system for implementing a digital filter of claim 1, further comprising a communication channel between the intelligent device and the interface.

14. The system for implementing a digital filter of claim 13 wherein the communication channel comprises a communication bus connecting the intelligent device to a computer workstation, the computer or workstation executing an interface application adapted to display the digital filter design parameters on a display device, receive digital filter design parameter values from a user, and forward the received digital filter design parameter values to the intelligent device.

15. The system for implementing the digital filter of claim 13 wherein the communication channel comprises a temporary connection between the intelligent device and a hand held configuration tool.

16. The system for implementing a digital filter of claim 1 wherein the interface comprises a process control variable input, such that at least one frequency response characteristic of the digital filter is determined by a value of the process control variable.

17. The system for implementing a digital filter of claim 1 wherein the intelligent device comprises a process control field device.

18. A process control device comprising:
   a processor;
   a memory storing a digital filter design algorithm;
   a first input adapted to receive digital filter design parameter values for specifying desired frequency response characteristics of a digital filter; and
   a second input for receiving process variable data;
   the processor adapted to execute the digital filter design algorithm to create a digital filter having the desired frequency response characteristics, and apply the digital filter to the process variable data.

19. The process control device of claim 18 wherein the digital filter design algorithm comprises an equipple filter design algorithm.

20. The process control device of claim 18 wherein the digital filter design algorithm comprises a Remez Exchange filter design algorithm.

21. The process control device of claim 18 wherein the digital filter design algorithm comprises a Parks-McClellan filter design algorithm.

22. The process control device of claim 18 wherein the digital filter design parameters comprise a filter type.

23. The process control device of claim 22 wherein the filter type comprises one of a low pass filter or a high pass filter.

24. The process control device of claim 23 wherein the filter design parameters further comprise a cut-off frequency.

25. The process control device of claim 23 wherein the filter design parameters further comprise a transition width.

26. The process control device of claim 22 wherein the filter type comprises a bandpass filter.

27. The process control device of claim 26 wherein the filter design parameters further comprise a passband center frequency and a passband width.

28. The process control device of claim 26 wherein the filter design parameters further comprise a low frequency cut off frequency and a high frequency cut off frequency.

29. The process control device of claim 26 wherein the filter design parameters further comprise a transition width.

30. The process control device of claim 18 wherein the first input comprises a communication bus implementing a communication protocol for communicating data between the intelligent process control device and a configuration tool.

31. The process control device of claim 18 wherein the first input comprises a temporary communication link between the intelligent process control device and a hand-held configuration tool.

32. The process control device of claim 18 wherein the first input comprises an operating parameter value associated with the process.

33. The process control device of claim 32 wherein the operating parameter value comprises a process variable value.

34. A method of filtering process variable data comprising:
   implementing a digital filter design algorithm in a process related control device;
   exposing one or more filter parameters to an interface whereby filter parameter values may be provided to the digital filter design algorithm;
   providing filter parameter values to the digital filter design algorithm;
   calculating digital filter coefficients using the digital filter design algorithm based on the provided filter parameter values; and
   applying a digital filter having the calculated digital filter coefficient to the process variable data.

35. The method of claim 34 wherein implementing a digital filter design algorithm comprises implementing a digital filter design algorithm adapted to generate filter coefficients of an infinite impulse response filter.

36. The method of claim 34 wherein implementing a digital filter design algorithm comprises implementing a digital filter design algorithm adapted to generate filter coefficients of a finite impulse response filter.

37. The method of claim 34 wherein implementing a digital filter design algorithm comprises implementing an equiripple filter design algorithm.

38. The method of claim 34 wherein implementing a digital filter design algorithm comprises implementing a Remez Exchange filter design algorithm.

39. The method of claim 34 wherein implementing a digital filter design algorithm comprises implementing a Parks-McClellan filter design algorithm.

40. The method of claim 34 wherein implementing a digital filter design algorithm comprises configuring the digital filter design algorithm in an abnormal situation prevention block associated with a process control device.

41. The method of claim 34 wherein exposing filter parameters comprises exposing a selectable filter type.

42. The method of claim 41 wherein the selectable filter type comprises one of a highpass filter and a lowpass filter.

43. The method of claim 42 wherein exposing filter parameters further comprises exposing a cut-off frequency parameter and a transition width parameter.

44. The method of claim 41 wherein the selectable filter type comprises a bandpass filter.

45. The method of claim 44 wherein exposing filter parameters further comprises exposing a passband center frequency parameter and a passband width parameter.

46. The method of claim 44 wherein exposing filter parameters further comprises exposing a low frequency cut off frequency parameter and a high frequency cut off frequency parameter.

47. The method of claim 44 wherein exposing filter parameters further comprise exposing a transition width parameter.

48. The method of claim 34 wherein exposing filter parameters comprises communicating filter parameters to a configuration tool.

49. The method of claim 48 wherein the configuration tool comprises a software application executed by a computer, and exposing the filter parameters comprises communicating the filter parameters to the computer over a network or bus.

50. The method of claim 48 wherein the communication tool comprises a handheld communicator, and exposing the filter parameters comprises communicating the filter parameters to the handheld communicator over a temporary communication link.

51. The method of claim 48 wherein providing parameter values to the digital filter design algorithm comprises communicating user entered parameter values to the digital filter design algorithm from the configuration tool.

52. The method of claim 34 wherein providing filter parameter values to the digital filter design algorithm comprises providing a process variable value to a process control function block implementing the digital filter design algorithm.

* * * * *

UNITED STATES PATENT AND TRADEMARK OFFICE
CERTIFICATE OF CORRECTION

| | | |
|---|---|---|
| PATENT NO. | : 8,301,676 B2 | Page 1 of 1 |
| APPLICATION NO. | : 11/895184 | |
| DATED | : October 30, 2012 | |
| INVENTOR(S) | : John P. Miller | |

It is certified that error appears in the above-identified patent and that said Letters Patent is hereby corrected as shown below:

In the Specification:

At Column 13, line 22, "abnormal" should be -- Abnormal --.

At Column 13, line 51, "abnommal" should be -- abnormal --.

Signed and Sealed this
Seventeenth Day of November, 2015

Michelle K. Lee
*Director of the United States Patent and Trademark Office*